United States Patent
Zhang et al.

(10) Patent No.: US 11,451,325 B2
(45) Date of Patent: Sep. 20, 2022

(54) BLOCK GENERATION METHOD AND APPARATUS, AND BLOCK RECEIVING METHOD AND APPARATUS

(71) Applicant: HUAWEI TECHNOLOGIES CO., LTD., Guangdong (CN)

(72) Inventors: Hongbiao Zhang, Shenzhen (CN); Shuai Xiao, Wuhan (CN); Desheng Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/193,374

(22) Filed: Mar. 5, 2021

(65) Prior Publication Data
US 2021/0194624 A1    Jun. 24, 2021

Related U.S. Application Data

(63) Continuation of application No. PCT/CN2019/104531, filed on Sep. 5, 2019.

(30) Foreign Application Priority Data

Sep. 7, 2018    (CN) .......................... 201811042289.8

(51) Int. Cl.
*H04L 1/00*  (2006.01)
*H04L 12/931*  (2013.01)
*H04L 49/351*  (2022.01)

(52) U.S. Cl.
CPC .......... *H04L 1/0015* (2013.01); *H04L 1/0033* (2013.01); *H04L 1/0036* (2013.01); *H04L 49/351* (2013.01)

(58) Field of Classification Search
CPC ... H04L 1/0015; H04L 1/0033; H04L 1/0036; H04L 49/351; H04L 1/0057; H04L 1/0071; H04L 1/0072; H04L 1/0075
See application file for complete search history.

(56) References Cited

U.S. PATENT DOCUMENTS 8,705,633 B2 *  4/2014 Herrity .................. H04N 19/89
                                                    714/707
9,154,454 B1   10/2015 Kumar et al.
(Continued)

FOREIGN PATENT DOCUMENTS

CN    104426629 A    3/2015
CN    106788855 A    5/2017
CN    107566075 A    1/2018

OTHER PUBLICATIONS

Y. Zhu et al., ISIS Extensions for Flex Ethernet Link Advertisement,draft-zhu-ccamp-flexe-link-advertisement-00. Jun. 25, 2018, 6 pages.
(Continued)

*Primary Examiner* — Luat Phung

(57) ABSTRACT

A block generation method and apparatus, and a block receiving method and apparatus are disclosed. The block generation method includes: generating a first block and a second block, where the first block includes a first block unit, the second block includes a second block unit, a first indicator is configured in the first block unit, and the first indicator is used to indicate whether the second block unit is a control code; and sending the first block and the second block. According to this method, an indicator is configured in a block unit in the first block to indicate whether an adjacent block is a control code, so that a boundary between a control code and a data code is determined, thereby avoiding extra indication information for an indication and reducing overheads of the indication information.

17 Claims, 24 Drawing Sheets

(56) References Cited

U.S. PATENT DOCUMENTS

2013/0346823 A1* 12/2013 Cideciyan ............ H03M 13/13
                                                        714/752
2019/0068325 A1*  2/2019 Gorshe ................. H04L 1/0079
2019/0334659 A1* 10/2019 Ye ......................... H04L 1/1867

OTHER PUBLICATIONS

Huawei Technologies Co., Ltd., Ultra-Low Latency Ethernet Ethernet Everywhere, Network Technology Lab of 2012 Labs, total 11 pages.
IA OIF-FLEXE-01.0, Flex Ethernet Implementation Agreement, Mar. 2016, total 31 pages.
Office Action dated Feb. 2, 2021 issued in Chinese Application No. 201811042289.8 (7 pages).
Raja Sattiraju et al., Reliability Analysis of a Wireless Transmission as a Repairable system, Globecom 2014 Workshop- Ultra-Low Latency and Ultra-High Reliability in Wireless Communications, 5 pages.
Ericsson LM, EC-GSM-IoT RLC/MAC Block Structure and Control messages, Miscellaneous corrections, 3GPP TSG-GERAN #70, GP-160314, Nanjing, PR China, May 23-27, 2016, 81 pages.
Notice of Alllowance dated Sep. 23, 2021 issued in Chinese Application No. 201811042289.8 (5 pages).

* cited by examiner

| 8 octets with T/RXC | | | | | | | | | 0 0 0 0 0 0 0 0 0 0 1 1 1 1 1 1 1 1 1 1 2 2 2 2 2 2 2 2 2 2 3 3 3 3 3 3 3 3 3 3 4 4 4 4 4 4 4 4 4 4 5 5 5 5 5 5 5 5 5 5 6 6 6 6 6 6<br>0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 6 7 8 9 0 1 2 3 4 5 | | | | | | | | 2.5/5 10GE | 40GE 100GE | CPRI |
|---|---|---|---|---|---|---|---|---|---|---|---|---|---|---|---|---|---|---|
| D0 | D1 | D2 | D3 | D4 | D5 | D6 | D7 | 0 1 | D0 | D1 | D2 | D3 | D4 | D5 | D6 | D7 | Valid | Valid | Valid |
| C0 | C1 | C2 | C3 | C4 | C5 | C6 | C7 | 1 0 | 0x1E | C0 | C1 | C2 | C3 | C4 | C5 | C6 | C7 | Valid | Valid | Invalid |
| C0 | C1 | C2 | C3 | O4 | C5 | C6 | C7 | 1 0 | 0x2D | C0 | C1 | C2 | O4 | | | | | Valid | Invalid | Invalid |
| C0 | C1 | C2 | C3 | S4 | D5 | D6 | D7 | 1 0 | 0x33 | C0 | C1 | C2 | O0 | | | | | Valid | Invalid | Invalid |
| O0 | D1 | D2 | D3 | S4 | D5 | D6 | D7 | 1 0 | 0x66 | D0 | D1 | D2 | O0 | | | | | Valid | Invalid | Invalid |
| O0 | D1 | D2 | D3 | D4 | D5 | D6 | D7 | 1 0 | 0x55 | D0 | D1 | D2 | D3 | | | | D7 | Valid | Invalid | Invalid |
| S0 | D1 | D2 | D3 | D4 | D5 | D6 | D7 | 1 0 | 0x78 | D0 | D1 | D2 | D3 | D4 | D5 | D6 | D7 | Valid | Valid | Invalid |
| O0 | D1 | D2 | D3 | C4 | C5 | C6 | C7 | 1 0 | 0x4B | D0 | D1 | C2 | C3 | C4 | C5 | C6 | C7 | Valid | Valid | Invalid |
| T0 | C1 | C2 | C3 | C4 | C5 | C6 | C7 | 1 0 | 0x87 | | C1 | C2 | C3 | C4 | C5 | C6 | C7 | Valid | Valid | Invalid |
| D0 | T1 | C2 | C3 | C4 | C5 | C6 | C7 | 1 0 | 0x99 | D0 | | C2 | C3 | C4 | C5 | C6 | C7 | Valid | Valid | Invalid |
| D0 | D1 | T2 | C3 | C4 | C5 | C6 | C7 | 1 0 | 0xAA | D0 | D1 | | C3 | C4 | C5 | C6 | C7 | Valid | Valid | Invalid |
| D0 | D1 | D2 | T3 | C4 | C5 | C6 | C7 | 1 0 | 0xB4 | D0 | D1 | D2 | | C4 | C5 | C6 | C7 | Valid | Valid | Invalid |
| D0 | D1 | D2 | D3 | T4 | C5 | C6 | C7 | 1 0 | 0xCC | D0 | D1 | D2 | D3 | | C5 | C6 | C7 | Valid | Valid | Invalid |
| D0 | D1 | D2 | D3 | D4 | T5 | C6 | C7 | 1 0 | 0xD2 | D0 | D1 | D2 | D3 | D4 | | C6 | C7 | Valid | Valid | Invalid |
| D0 | D1 | D2 | D3 | D4 | D5 | T6 | C7 | 1 0 | 0xE1 | D0 | D1 | D2 | D3 | D4 | D5 | | C7 | Valid | Valid | Invalid |
| D0 | D1 | D2 | D3 | D4 | D5 | D6 | T7 | 1 0 | 0xFF | D0 | D1 | D2 | D3 | D4 | D5 | D6 | | Valid | Valid | Valid |
| | | | | | | | | | Reserved | R R | R R | R R | R R | R R | R R | R R | R R R R R | | | |

FIG. 3

| Service type | Service subtype | Bitstream type |
|---|---|---|
| Synchronous digital hierarchy SDH | STM-1/STM-4/STM-16/STM-64 or the like | Frame type Frame |
| Optical transponder unit OTUk | OTU1/OTU2/OTU2e/OTU3 or the like | Frame type Frame |
| Ethernet service ETH | GE/10GBASE-X | 8B/10B encoding |
| | 10GBASE-R/25GE/40GE/50GE/100GE | 64B/66B encoding |
| Fibre channel FC | FC100/FC200/FC4000/FC800 | 8B/10B encoding |
| | FC1200/FC1600 | 64B/66B encoding |

| T7 block | 10 | 0xFF | D0 | D1 | D2 | D3 | D4 | D5 | D6 |

| S0 block | 10 | 0x78 | D1 | D2 | D3 | D4 | D5 | D6 | D7 |

| D block | 01 | D0 | D1 | D2 | D3 | D4 | D5 | D6 | D7 |

| O block | 10 | D1 | D2 | D3 | O0 | C4 | C5 | C6 | C7 |

| IDLE block | 10 | 0x1E | C0 | C1 | C2 | C3 | C4 | C5 | C6 | C7 |

| Input Data<br>Bit position:<br>Data block format: | Sync | Block Payload<br>Block payload | | | | | | | |
|---|---|---|---|---|---|---|---|---|---|
| | | 2 | | | | | | | 65 |
| $D_0 D_1 D_2 D_3 D_4 D_5 D_6 D_7$ | 01 | $D_0$ | $D_1$ | $D_2$ | $D_3$ | $D_4$ | $D_5$ | $D_6$ | $D_7$ |
| Control block formats: | | Block type field | | | | | | | |
| $C_0 C_1 C_2 C_3 / C_4 C_5 C_6 C_7$ | 10 | 0x1e | $C_0$ | $C_1$ | $C_2$ | $C_3$ | $C_4$ | $C_5$ | $C_6$ | $C_7$ |
| $C_0 C_1 C_2 C_3 / O_4 D_5 D_6 D_7$ | 10 | 0x2d | $C_0$ | $C_1$ | $C_2$ | $C_3$ | $O_4$ | $D_5$ | $D_6$ | $D_7$ |
| $C_0 C_1 C_2 C_3 / S_4 D_5 D_6 D_7$ | 10 | 0x33 | $C_0$ | $C_1$ | $C_2$ | $C_3$ | | $D_5$ | $D_6$ | $D_7$ |
| $O_0 C_1 C_2 C_3 / S_4 D_5 D_6 D_7$ | 10 | 0x66 | $D_1$ | $C_2$ | $C_3$ | $O_0$ | | $D_5$ | $D_6$ | $D_7$ |
| $O_0 C_1 C_2 C_3 / O_4 D_5 D_6 D_7$ | 10 | 0x55 | $D_1$ | $C_2$ | $C_3$ | $O_0$ | $O_4$ | $D_5$ | $D_6$ | $D_7$ |
| $S_0 C_1 C_2 C_3 / D_4 D_5 D_6 D_7$ | 10 | 0x78 | $D_1$ | $D_2$ | $D_3$ | $D_4$ | | $D_5$ | $D_6$ | $D_7$ |
| $O_0 C_1 C_2 D_3 / C_4 C_5 C_6 C_7$ | 10 | 0x4b | $D_1$ | $C_2$ | $C_3$ | $O_0$ | $C_4$ | $C_5$ | $C_6$ | $C_7$ |
| $T_0 C_1 C_2 C_3 / C_4 C_5 C_6 C_7$ | 10 | 0x87 | | $C_1$ | $C_2$ | $C_3$ | $C_4$ | $C_5$ | $C_6$ | $C_7$ |
| $D_0 T_1 C_2 C_3 / C_4 C_5 C_6 C_7$ | 10 | 0x99 | $D_0$ | | $C_2$ | $C_3$ | $C_4$ | $C_5$ | $C_6$ | $C_7$ |
| $D_0 D_1 T_2 C_3 / C_4 C_5 C_6 C_7$ | 10 | 0xaa | $D_0$ | $D_1$ | | $C_3$ | $C_4$ | $C_5$ | $C_6$ | $C_7$ |
| $D_0 D_1 D_2 T_3 / C_4 C_5 C_6 C_7$ | 10 | 0xb4 | $D_0$ | $D_1$ | $D_2$ | | $C_4$ | $C_5$ | $C_6$ | $C_7$ |
| $D_0 D_1 D_2 D_3 / T_4 C_5 C_6 C_7$ | 10 | 0xcc | $D_0$ | $D_1$ | $D_2$ | $D_3$ | | $C_5$ | $C_6$ | $C_7$ |
| $D_0 D_1 D_2 D_3 / D_4 T_5 C_6 C_7$ | 10 | 0xd2 | $D_0$ | $D_1$ | $D_2$ | $D_3$ | $D_4$ | | $C_6$ | $C_7$ |
| $D_0 D_1 D_2 D_3 / D_4 D_5 T_6 C_7$ | 10 | 0xe1 | $D_0$ | $D_1$ | $D_2$ | $D_3$ | $D_4$ | $D_5$ | | $C_7$ |
| $D_0 D_1 D_2 D_3 / D_4 D_5 D_6 T_7$ | 10 | 0xff | $D_0$ | $D_1$ | $D_2$ | $D_3$ | $D_4$ | $D_5$ | $D_6$ | |

FIG. 18a

| Input Data<br>Bit position:<br>Data block format: | Sync | Block Payload<br>Block payload | | | | | | | | |
|---|---|---|---|---|---|---|---|---|---|---|
| | | 2 | | | | | | | | 65 |
| $D_0 D_1 D_2 D_3 D_4 D_5 D_6 D_7$ | 01 | $D_0$ | $D_1$ | $D_2$ | $D_3$ | $D_4$ | $D_5$ | $D_6$ | $D_7$ | |
| Control block formats: | | Block type field | | | | | | | | |
| $C_0 C_1 C_2 C_3 C_4 C_5 C_6 C_7$ | 10 | 0x1E | $C_0$ | $C_1$ | $C_2$ | $C_3$ | $C_4$ | $C_5$ | $C_6$ | $C_7$ |
| $S_0 D_1 D_2 D_3 D_4 D_5 D_6 D_7$ | 10 | 0x78 | $D_1$ | $D_2$ | $D_3$ | $D_4$ | $D_5$ | $D_6$ | $D_7$ | |
| $O_0 D_1 D_2 D_3 Z_4 Z_5 Z_6 Z_7$ | 10 | 0x4B | $D_1$ | $D_2$ | $D_3$ | $O_0$ | 0x000_0000 | | | |
| $T_0 C_1 C_2 C_3 C_4 C_5 C_6 C_7$ | 10 | 0x87 | $C_1$ | $C_2$ | $C_3$ | $C_4$ | $C_5$ | $C_6$ | $C_7$ | |
| $D_0 T_1 C_2 C_3 C_4 C_5 C_6 C_7$ | 10 | 0x99 | $D_0$ | $C_2$ | $C_3$ | $C_4$ | $C_5$ | $C_6$ | $C_7$ | |
| $D_0 D_1 T_2 C_3 C_4 C_5 C_6 C_7$ | 10 | 0xAA | $D_0$ | $D_1$ | $C_3$ | $C_4$ | $C_5$ | $C_6$ | $C_7$ | |
| $D_0 D_1 D_2 T_3 C_4 C_5 C_6 C_7$ | 10 | 0xB4 | $D_0$ | $D_1$ | $D_2$ | $C_4$ | $C_5$ | $C_6$ | $C_7$ | |
| $D_0 D_1 D_2 D_3 T_4 C_5 C_6 C_7$ | 10 | 0xCC | $D_0$ | $D_1$ | $D_2$ | $D_3$ | $C_5$ | $C_6$ | $C_7$ | |
| $D_0 D_1 D_2 D_3 D_4 T_5 C_6 C_7$ | 10 | 0xD2 | $D_0$ | $D_1$ | $D_2$ | $D_3$ | $D_4$ | $C_6$ | $C_7$ | |
| $D_0 D_1 D_2 D_3 D_4 D_5 T_6 C_7$ | 10 | 0xE1 | $D_0$ | $D_1$ | $D_2$ | $D_3$ | $D_4$ | $D_5$ | $C_7$ | |
| $D_0 D_1 D_2 D_3 D_4 D_5 C_6 T_7$ | 10 | 0xFF | $D_0$ | $D_1$ | $D_2$ | $D_3$ | $D_4$ | $D_5$ | $D_6$ | |

FIG. 18b

BLOCK GENERATION METHOD AND APPARATUS, AND BLOCK RECEIVING METHOD AND APPARATUS

CROSS-REFERENCE TO RELATED APPLICATIONS

This application is a continuation of International Application No. PCT/CN2019/104531, filed on Sep. 5, 2019, which claims priority to Chinese Patent Application No. 201811042289.8, filed on Sep. 7, 2018, The disclosures of the aforementioned applications are hereby incorporated by reference in their entireties.

TECHNICAL FIELD

This application relates to the communications field, and in particular, to a block generation method and apparatus, and a block receiving method and apparatus.

BACKGROUND

A 5th generation (5G) communication technology is widely studied in the industry, and the standardization organization 3GPP defines three 5G scenarios: enhanced mobile broadband (eMBB), massive internet of things (massive Machine Type of Communication, mMTC), and an ultra-reliable and low latency service (URLLC), which respectively focus on a heavy-traffic mobile broadband service such as a 3D/ultra high definition video, a massive internet of things service, and an ultra-reliable and low latency connection service (for example, unmanned driving or industrial automation). An important topic is to reduce a latency and ensure reliability and security of service transmission.

Currently, a bit block switching technology based on a flexible Ethernet (Ethernet) physical layer that is abbreviated as an X-E (X-Ethernet) technology is disclosed, for example, a 64B/66B block, and is characterized with a deterministic ultra-low latency. A hierarchy of this technology is abstracted as devices or apparatuses shown in FIG. 1a and FIG. 1b. FIG. 1a shows a network device that is connected to a user and that is at a network edge, for example, a provider edge router (Provider Edge, PE), and the device is equipped with an NNI-side network interface and a UNI-side network interface. FIG. 1b shows a network device (Provider, P) within a network, and the device is equipped with only an NNI-side network interface.

FIG. 2 is a schematic diagram of using an X-E technology to build a network and forward a data stream. A solid-line path that passes through entire PE and P devices is an X-E end-to-end forwarding path. In this forwarding path, a bitstream using L1.5 switching is clearly defined as 64B/66B encoding, and a type of the bitstream is shown in FIG. 3. In 64B/66B encoding, 64-bit data or control information is encoded into a 66-bit block for transmission. The first two bits of the 66-bit block represent a synchronization header that is mainly used for data alignment at a receive end and synchronization of received data bit streams. Specifically, the synchronization header includes "01" and "10". "01" indicates that the following 64 bits are all data, and "10" indicates that the following 64 bits are a mixture of data and control information, where 8 bits next to the synchronization header are a type field, and the following 56 bits are control information, data, or a mixture of the two.

China Mobile requires a new interface and switching technology based on Flex E, which is simply an L1.5 switching technology. An important topic in a hierarchy of the L1.5 switching technology is multi-service bearing. For example, FIG. 4 shows typical multi-service type bearing and rates. It may be learned from FIG. 4 that, except that a synchronous digital hierarchy (SDH) service and an optical transponder unit (OTUk) service use a data stream of a frame structure, bitstreams of other services are 8B/10B bitstreams other than 64B/66B. Therefore, before multi-service access, all these 8B/10B bitstreams need to be converted into standard 64B/66B encoded bitstreams, and a boundary between control information and data is determined based on the converted 64B/66B encoded bitstream.

Currently, when a boundary between control information and data of a converted 64B/66B encoded bitstream is being identified, extra indication information needs to be used for an indication. Consequently, the extra indication information occupies a specified quantity of bit resources, thereby increasing overheads.

SUMMARY

This application provides a block generation method. In the method, overheads of extra indication information can be reduced. Specifically, the following technical solutions are disclosed:

According to a first aspect, this application provides a block generation method. The method includes: generating, by an adaptation unit, a first block and a second block, where the first block includes a first block unit, the second block includes a second block unit, and a first indicator is configured in the first block unit, and the first indicator is used to indicate whether the second block unit is a control code; and sending the first block and the second block.

Optionally, the second block is after the first block or before the first block. If the second block is after the first block, the first indicator is used to indicate whether a next block of the current first block, namely, the second block, is a control code. If the second block is before the first block, the first indicator is used to indicate whether a previous block of the current first block is a control code.

Optionally, the first block and the second block are two adjacent blocks, and each block is a 64B/66B block.

Optionally, the first indicator is represented by a, and occupies 1-bit space.

According to the method provided in this aspect, an indicator is configured in a block unit in the first block to indicate whether an adjacent block is a control code, so that a boundary between a control code and a data code can be determined, thereby avoiding extra indication information for an indication and reducing overheads of the indication information.

Further, if the first indicator indicates that the second block unit is a control code, it may be determined, based on an indicator configured in the second block unit, whether a next block is a control code; or if the first indicator indicates that the second block unit is a data code instead of a control code, it is determined that a data code starts from the second block unit and each block unit before the second block unit is a control code, so that a boundary between a control code and a data code is determined.

With reference to the first aspect, in a possible implementation of the first aspect, the first block further includes a third block unit, and the third block unit is before the first block unit; and a second indicator is further configured in the first block unit, and the second indicator is used to indicate whether the third block unit before the first block unit is a control code.

Further, if the second indicator indicates that the third block unit is a control code, it is further determined, based on an indicator in the third block unit, whether a previous block is a control code; or if the second indicator indicates that the third block unit is a data code instead of a control code, a boundary between the third block unit and the first block unit is a boundary between a data code and a control code.

Optionally, the second indicator is represented by b, and occupies 1-bit space.

With reference to the first aspect, in another possible implementation of the first aspect, the control code includes one K code, or includes one K code and at least one D code; and if the first block unit is a control code, a third indicator is further configured in the first block unit, and the third indicator is used to indicate a quantity of D codes in the first block unit.

Optionally, the D code is a data code, and is used to indicate a type of the K code. For example, a Di code indicates that the K code is an IDLE control code, and a Dt code indicates that the K code is a T control code. Further, the type of the K code is determined based on an original bitstream, and the original block may be a 6B/10B block or a 10GBASE-R 64B/66B bitstream. This is not limited in this embodiment of this application.

Optionally, the quantity of D codes may be represented by a length of a block unit. For example, in a fibre channel service, each control code is in units of 4 bytes, namely, 32 bits, and a structure is K+D+D+D. In this case, the quantity of D codes is 3. Each D code is an 8-bit block unit.

Optionally, the quantity of D codes in the first block unit is represented by cc, and occupies 2-bit space.

With reference to the first aspect, in still another possible implementation of the first aspect, the second block further includes a fourth block unit, the fourth block unit is after the second block unit, at least one indicator is configured in the second block unit, and the at least one indicator is used to indicate whether the fourth block unit is a control code and indicate whether the first block unit is a control code; and if the second block unit is a control code, the at least one indicator is further used to indicate a quantity of D codes in the second block unit.

Further, the at least one indicator includes: a first indicator that is used to indicate whether a next block unit of a current block unit is a control code; a second indicator that is used to indicate whether a previous block unit of the current block unit is a control code; and a third indicator that is used to indicate a quantity of D codes in a block unit constituting a control code.

In this implementation, at least one indicator is configured in a block unit to indicate whether a previous block unit and a next block unit of a current block unit are control codes and indicate a D code length of the control code, so that a boundary between a control code and a data code is determined based on a level-by-level indication of an indicator in each block unit, thereby avoiding overheads of extra information.

With reference to the first aspect, in still another possible implementation of the first aspect, the generating a first block and a second block includes: obtaining a first bitstream, where the first bitstream includes a control code; and compressing the control code in the first bitstream, configuring a first indicator in remaining block space after the compression, and generating the first block and the second block.

Optionally, the first bitstream may be an 8B bitstream, and the 8B bitstream is converted from a 10B bitstream in an 8B/10B bitstream; or the first bitstream may be a 64B/66B bitstream of a 10GE service.

With reference to the first aspect, in still another possible implementation of the first aspect, the control code in the first bitstream includes at least one 8-bit block unit; and the compressing the control code in the first bitstream, configuring a first indicator in remaining block space after the compression, and generating the first block and the second block includes: compressing one 8-bit block unit in the first bitstream to obtain N-bit remaining space, where N≤8; configuring the first indicator in the N-bit remaining space, and filling the N-bit remaining space with one 8-bit K code; and generating the first block and the second block based on the 8-bit K code.

Optionally, in a possible implementation, a control code in an original 8B bitstream is compressed into a plurality of block units, each block unit is compressed from original 8 bits into 4 bits, and remaining 4-bit space is used to configure a first indicator, a second indicator, and a third indicator.

The first indicator and the second indicator each occupy 1 bit, and the third indicator occupies 2 bits, to form one K code, where the K code is an 8-bit block unit. In addition, the control code before the compression may further include several D codes. For example, in a service, the control code includes one K code and three D codes, each D code is 8 bits, and the control code including the one K code and the three D codes is a block unit.

In this implementation, a 10B bitstream is first decoded into an 8B bitstream to obtain the first bitstream, thereby reducing 20% fixed overheads. Then, the control code in the first bitstream is compressed, and an indicator is configured in remaining space after the compression to indicate statuses of a control code and a data code of an adjacent block, thereby reducing overheads of indication information and improving transcoding efficiency.

In addition, in this implementation, block loading utilization is increased by 25% compared with transparent bearing of a D block, and a boundary between a control code and a data code of an 8B/10B bitstream does not need to be restored. In this way, adjacent blocks are associated level by level based on an indication of remaining block overheads after a control code is compressed, thereby identifying a characteristic and a meaning of an entire bitstream.

With reference to the first aspect, in still another possible implementation of the first aspect, the first block is a T7 block, and the second block is a D block; or the first block is an S0 block, and the second block is a D block; or the first block is an O block, and the second block is a D block; or the first block is an IDLE block, and the second block is a D block, where the T7 block, the S0 block, the O block, and the IDLE block are control codes, and the D block is a data code.

Optionally, the first block may be alternatively a D block, and the second block is a control code, for example, a T7 block or an S0 block. This is not limited in this application.

Optionally, more blocks such as a third block and a fourth block may be further included, and a bitstream including these blocks includes but is not limited to various forms such as S0 block+D block, D block+T block, O block+D block, and S0 block+D block+T block.

Optionally, the first block is a T7 block, and the second block is an S0 block; and the method further includes: generating a third block, where the third block is a D block.

Optionally, if the first block is a T7 block and the second block is a D block, the method further includes: transcoding the D code into an S0 block, where the S0 block includes a type field, a block unit of a K code, and at least one block unit including a D code.

The block unit including the K code is a block unit generated after each block unit that is of the original D block and that includes one K code and at least one D code is compressed, and the block unit of the K code includes at least one indicator. The type field of the S0 block is a "0x78" field or a block unit.

For example, an IDLE block in an original bitstream is compressed to generate a block unit. The block unit is obtained by compressing block units of four control codes in the original bitstream, and the block unit generated after the compression is after the type field "0x78", and includes a first indicator, a second indicator, and a third indicator. Further, the first indicator is used to indicate that a next block unit of a current block unit is a data code, the second indicator is used to indicate that a previous block unit of the current block unit is a control code, and the third indicator is used to indicate that the current block unit is obtained by compressing four IDLE codes in the original bitstream.

In this implementation, the IDLE block in the original bitstream is further compressed, so that a transcoded bitstream is compressed to have narrower bandwidth than the original bitstream. In this way, overhead characteristics such as a 100 ppm frequency deviation in an asynchronous networking system and intra-bandwidth OAM can be supported in some specific scenarios.

According to a second aspect, this application further provides a block receiving method. The method is used to receive a first block and a second block, and identify a boundary between a data code and a control code in a bitstream. Specifically, the method includes: receiving, by an adaptation unit, a first block and a second block, where the first block includes a first block unit, the second block includes a second block unit, and a first indicator is configured in the first block unit; and determining, based on an indication of the first indicator, whether the second block unit is a control code.

Optionally, the determining, based on an indication of the first indicator, whether the second block unit is a control code includes: if the first indicator indicates that the second block unit is a control code, determining, based on an indicator configured in the second block unit, whether a next block is a control code; or if the first indicator indicates that the second block unit is a data code instead of a control code, determining that a data code starts from the second block unit and each block unit before the second block unit is a control code, so that a boundary between a control code and a data code is determined.

With reference to the second aspect, in a possible implementation of the second aspect, the first block further includes a third block unit, the third block unit is before the first block unit, and a second indicator is further configured in the first block unit; and the method further includes: determining, based on an indication of the second indicator, whether the third block unit before the first block unit is a control code.

Optionally, the determining, based on an indication of the second indicator, whether the third block unit before the first block unit is a control code includes: if the second indicator indicates that the third block unit is a control code, further determining, based on an indicator in the third block unit, whether a previous block is a control code; or if the second indicator indicates that the third block unit is a data code instead of a control code, determining that a boundary between the third block unit and the first block unit is a boundary between a data code and a control code.

With reference to the second aspect, in another possible implementation of the second aspect, the control code includes one K code, or includes one K code and at least one D code; and the method further includes: if it is determined that the first block unit is a control code, determining a quantity of D codes in the first block unit based on a third indicator in the first block unit.

Optionally, if a transmit end and a receive end have agreed on a length of a block unit in advance, or in a specific service condition, for example, in a fibre channel service, a quantity or length of D codes can be determined without requiring the third indicator for an indication.

With reference to the second aspect, in still another possible implementation of the second aspect, the second block further includes a fourth block unit, the fourth block unit is after the second block unit, and at least one indicator is configured in the second block unit; and the method further includes: determining, based on the at least one indicator in the second block unit, whether the fourth block unit is a control code and whether the first block unit is a control code.

With reference to the second aspect, in still another possible implementation of the second aspect, the determining, based on an indication of the first indicator, whether the second block unit is a control code includes: if the first indication information indicates that the second block unit is not a control code, determining that a data code starts from the second block unit.

In addition, optionally, if the block unit indicated by the first indication information is a control code, it is further determined whether an indicator in the second block unit indicates that a next block unit is a control code, and by analogy, until a non-control code is indicated, so that a boundary between a data code and a control code can be determined.

Optionally, the first indicator, the second indicator, and the third indicator may be carried in remaining space after compression. For example, one 8-bit block unit of a control code in an original 8B bitstream is compressed into 4 bits, and remaining 4-bit space is used to configure three indicators, which occupy 4 bits in total. Finally, an 8-bit K code is generated. In addition, a filled D code may also be an 8-bit block unit, each D code is used to indicate a type of a corresponding K code, and the quantity of D codes may be 0 or may be 1, 3, or 7.

According to a third aspect, this application further provides a block generation apparatus. The apparatus may be an adaptation unit, for example, a uAdpt unit. The apparatus includes units configured to perform steps of the method in the first aspect and the implementations of the first aspect.

Specifically, the apparatus includes an obtaining unit, a processing unit, and a sending unit. In addition, the apparatus may further include another unit or module such as a storage unit.

According to a fourth aspect, this application further provides a block receiving apparatus. The apparatus may be an adaptation unit, for example, a uAdpt unit. The apparatus includes units configured to perform steps of the method in the second aspect and the implementations of the second aspect.

Specifically, the apparatus includes an obtaining unit, a processing unit, and a sending unit. In addition, the apparatus may further include another unit or module such as a storage unit.

It should be noted that the block generation apparatus in the third aspect and the block receiving apparatus in the fourth aspect in this application may be a same apparatus, for example, a uAdpt unit, or may be different apparatuses.

According to a fifth aspect, this application further provides a network device. The network element device may be a PE or a P, or may be a packet bearer device. Further, the network device includes an interface board and a switch control unit, the interface board includes a user-side processing chip, and the user-side processing chip is configured to implement the block generation method and the block receiving method in the first aspect and the implementations of the first aspect or the second aspect and the implementations of the second aspect.

Optionally, the user-side processing chip may be disposed on or integrated into a user-side time frequency unit uAdpt.

Optionally, the user-side processing chip further includes a memory or a storage unit, configured to store one or more computer instructions.

According to a sixth aspect, this application further provides a computer storage medium. The computer storage medium may store a program, and when the program is executed, a part or all of the steps in the embodiments of the block generation method and the block receiving method provided in this application may be performed.

According to a seventh aspect, this application further provides a computer program product, and the computer program product includes one or more computer instructions, for example, a block generation instruction, a block sending instruction, and a block receiving instruction. When a computer loads and executes the computer program, a part or all of steps in the embodiments of the block generation method and the block receiving method provided in this application may be implemented.

This application provides a block generation method and apparatus. A bitstream with a specific block structure is generated, the bitstream includes a first block and a second block, and at least one indicator is configured in each block to indicate whether an adjacent block unit is a control code, so that a boundary between a control code and a data code in an original bitstream is determined, thereby reducing overheads of extra indication information.

BRIEF DESCRIPTION OF DRAWINGS

FIG. 3 is a schematic diagram of 64B/66B block type encoding in the IEEE802.3 specification according to this application;

FIG. 18a is a schematic diagram of 10GBASE-R 64B/66B encoding according to an embodiment of this application;

FIG. 18b is a schematic diagram of 100GBASE-R 64B/66B encoding according to an embodiment of this application;

DESCRIPTION OF EMBODIMENTS

Before the technical solutions in the embodiments of this application are described, nouns in this application are first described.

Ethernet is a baseband local area network specification and is a most common communication protocol standard used in an existing local area network at present.

Flexible Ethernet (FlexE) is an interface technology that implements service isolation and bearing and network fragmentation, and has developed rapidly in the past two years and has been widely accepted by major standardization organizations.

Ubiquitous Ethernet (X-Ethernet, X-E) is a bit block switching technology hierarchy based on an Ethernet physical layer, and is characterized with a deterministic ultra-low latency, and an encoding type used by X-E may be a 64B/66B encoding type or the like.

M/N Bit Block Encoding

M/N bit block encoding is an encoding type of M payload bits/N total bits, and the N total bits include the M payload bits and several synchronization bits. In other words, M≤N in an M/N bit block. An M/N bit block stream is transmitted over an Ethernet physical layer link. For example, if 8B/10B encoding is used for 1G Ethernet, an 8B/10B block stream is transmitted over a 1GE physical layer link. If 64B/66B encoding is used for 10GE/40GE/100GE Ethernet, a 64B/66B block stream is transmitted over a 10GE/40GE/100GE Ethernet physical layer link. With development of an Ethernet technology, other encoding types will emerge in the future. For example, there may be possible encoding schemes such as 128B/130B encoding and 256B/257B encoding.

Non-M/N Bit Block Encoding

Non-M/N bit block encoding means that a used encoding technology is not M/N bit block encoding, but another service frame encoding method such as a synchronous digital hierarchy (SDH) or an optical transport network (OTN) is used.

The following describes in detail an application scenario and a system architecture of the technical solutions of this application.

The technical solutions provided in the embodiments of this application are based on a FlexE end-to-end networking technology, which is abbreviated as X-E below.

For example, a service transmission method provided in this application is applied to a scenario in which a service signal is transmitted based on the X-E technology, and at least two network devices are included, for example, a first network device and a second network device.

The first network device and the second network device may be PEs or Ps in X-E networking.

Figure 1A:
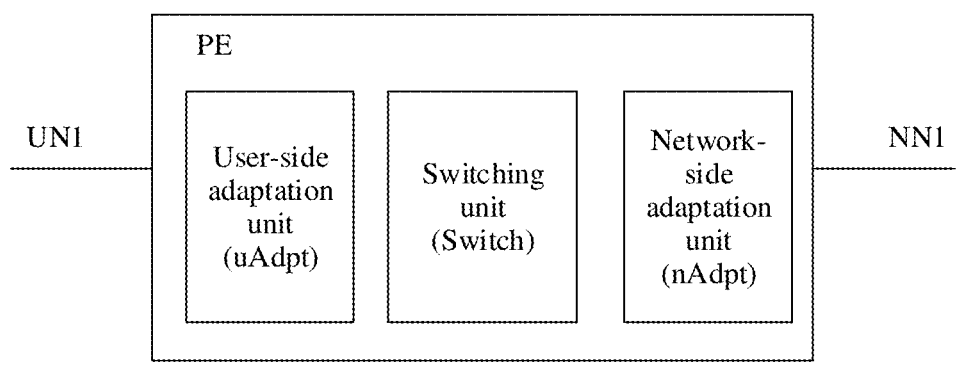
FIG. 1a is a schematic structural diagram of a network device PE that is connected to a user and that is at a network edge according to this application.

The PE is a network device that is connected to user equipment and that is at a network edge. As shown in FIG. 1*a*, the PE in the X-E networking may include a user-side adaptation unit (uAdpt), a switching unit (Switch), and a network-side adaptation unit (nAdpt).

The uAdpt includes a uAdpt deployed at a network ingress that is abbreviated as a uAdpt(i), and a uAdpt deployed at a network egress that is abbreviated as a uAdpt(e). The uAdpt(i) is configured to implement adaptation and interleaving of a low-speed service signal or a low-speed tunnel, to add the service signal to a FlexE high-speed tunnel. The uAdpt(e) is configured to restore the low-speed service signal or the low-speed tunnel from the FlexE high-speed tunnel to implement functions such as de-interleaving and adaptation.

The nAdpt is mainly configured to multiplex a FlexE tunnel into FlexE SHIM for transmission through a FlexE interface or restore a FlexE tunnel from FlexE SHIM of a FlexE interface. In the embodiments of this application, the uAdpt or the nAdpt in the PE may be used to perform multiplex transmission on received N service signals or to restore original N service signals from one service signal obtained through multiplexing. In actual application, a control unit may be deployed in the uAdpt or the nAdpt to implement the method in this application. The control unit may be software, a programmable device, an integrated circuit, or the like. For example, the integrated circuit may be an application-specific integrated circuit (ASIC).

Figure 1B:
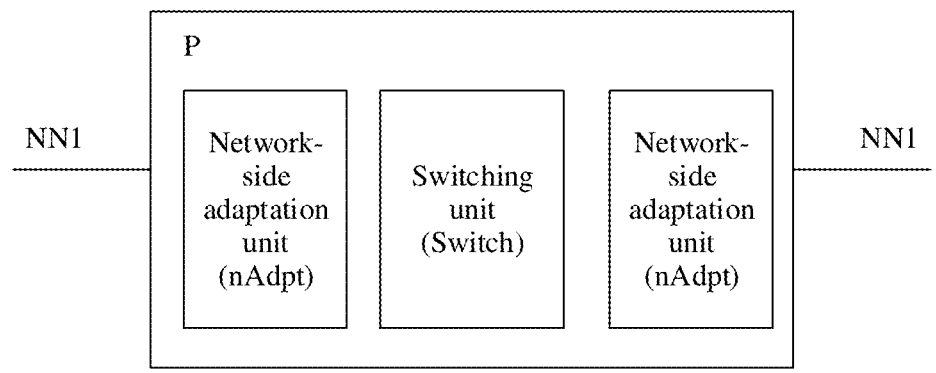
FIG. 1b is a schematic structural diagram of a network device P within a network according to this application.

FIG. 1*b* is a schematic structural diagram of a P in X-E networking according to this application. As shown in FIG. 1*b*, the P in the X-E networking may include nAdpts on both sides and a switch in the middle. In this application, the nAdpt in the P may be used to perform multiplex transmission on received N service signals or to restore original N service signals from one service signal obtained through multiplexing. In actual application, a control unit may be deployed in the nAdpt to implement the method in this application. The control unit may be software, a programmable device, an integrated circuit, or the like. For example, the integrated circuit may be an ASIC.

In the PE device shown in FIG. 1*a*, a user-side interface (User network interface, UNI) is used to connect a network device to user equipment. An interface (Network to Network interface, NNI) of the PE device is used to connect devices between networks or a device within a network. In the P device shown in FIG. 1*b*, two interfaces NN1 are both used to connect devices within a network.

Figure 2:
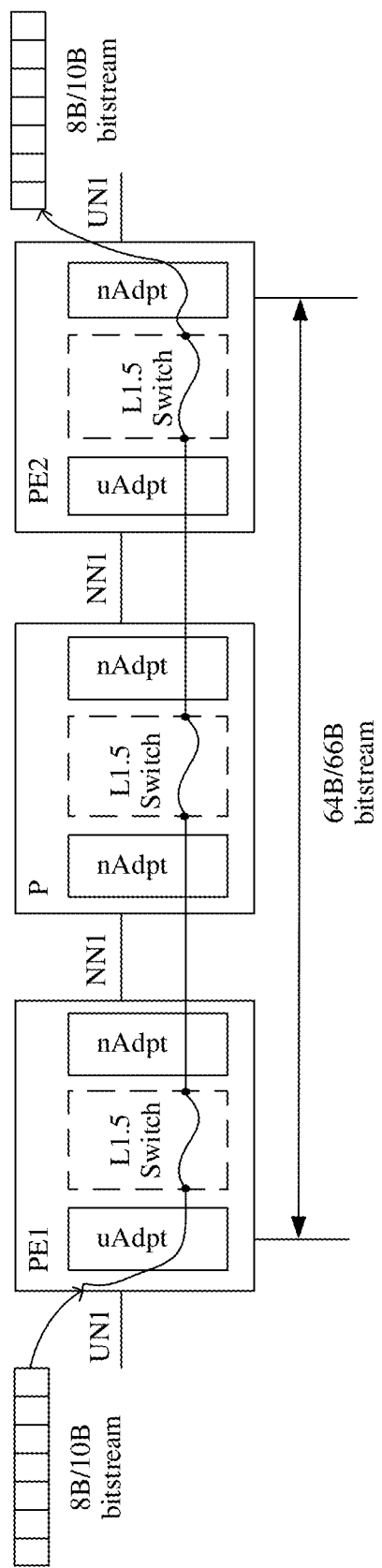
FIG. 2 is a schematic diagram of using an X-E technology to build a network and forward a data stream according to this application.
Figures 4, 5:
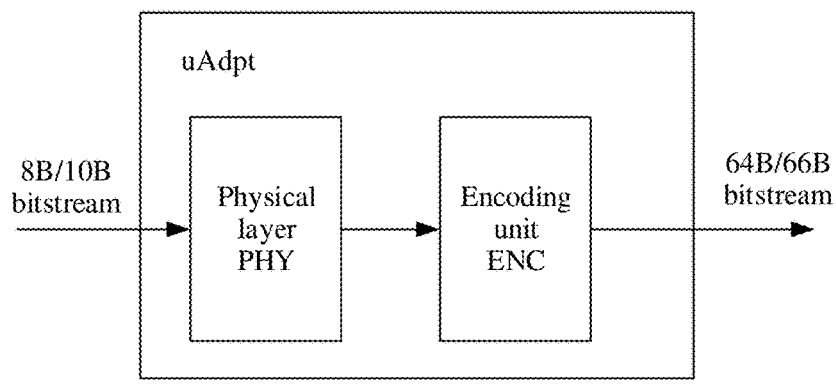
FIG. 4 is a schematic diagram of a typical multi-service type and a bitstream type according to this application.
FIG. 5 is a schematic structural diagram of an adaptation unit according to an embodiment of this application.

As shown in FIG. 2 or FIG. 5, an original 8B/10B bitstream is transcoded into a 64B/66B bitstream after passing through a uAdpt of a PE1, then the 64B/66B bitstream is input to a P device after passing through an L1.5 switching unit and an nAdpt and is input to a PE2 device after passing through the P device, and finally the 64B/66B bitstream is converted into the 8B/10B bitstream through an nAdpt of the PE2 device and the 8B/10B bitstream is output to user equipment.

FIG. 5 is a schematic structural diagram of a user-side adaptation unit according to an embodiment. The user-side adaptation unit may be a uAdpt. Further, the uAdpt includes a physical layer (Physical, PHY) and an encoding (ENC) unit. The ENC unit is configured to: convert an input 8B/10B bitstream into a 64B/66B encoded bitstream, and transmit the 64B/66B encoded bitstream to an X-E switching unit.

Figure 6:
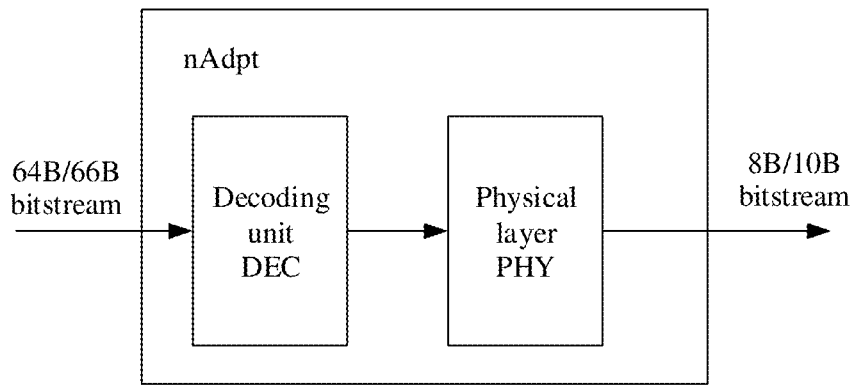
FIG. 6 is a schematic structural diagram of another adaptation unit according to an embodiment of this application.

FIG. 6 is a schematic structural diagram of a network-side adaptation unit according to an embodiment. The network-side adaptation unit may be an nAdpt. Further, the nAdpt includes a physical layer (Physical, PHY) and a decoding (DEC) unit. The DEC unit is configured to: convert a 64B/66B bitstream input by a device within a network into an 8B/10B encoded bitstream, and output the 8B/10B encoded bitstream.

This application is to resolve a technical problem that extra overheads are caused because extra indication information needs to be configured to indicate a control code and a data code when an 8B/10B encoded bitstream is converted into a 100GE standard 64B/66B bitstream.

Before the technical solutions of this application are described, a characteristic of the 8B/10B encoded bitstream is first briefly described.

8B/10B is also referred to as 8 bytes/10 bytes or 8B10B. 8B/10B encoding is a common encoding scheme currently used in high-speed serial communication. 8B/10B encoding is used to convert data of a one-byte width into a character of a 10-bit width by using a mapping mechanism, to equalize a quantity of zeros and a quantity of ones in a bit stream, or in other words, to balance a direct current. If 8-bit data is directly encoded into 10-bit data for transmission, a large physical area of a chip is occupied during implementation, and data transmission efficiency is seriously affected. Therefore, currently, an 8-bit binary numeral string is usually divided into low-order 5 bits and high-order 3 bits, then 5B/6B encoding is performed on the low-order 5 bits and 3B/4B encoding is performed on the high-order 3 bits, and finally 6 bits and 4 bits are combined for encoding. In this way, not only the occupied area of the chip is reduced, but also encoding is simplified, thereby improving data transmission efficiency.

Figure 7:
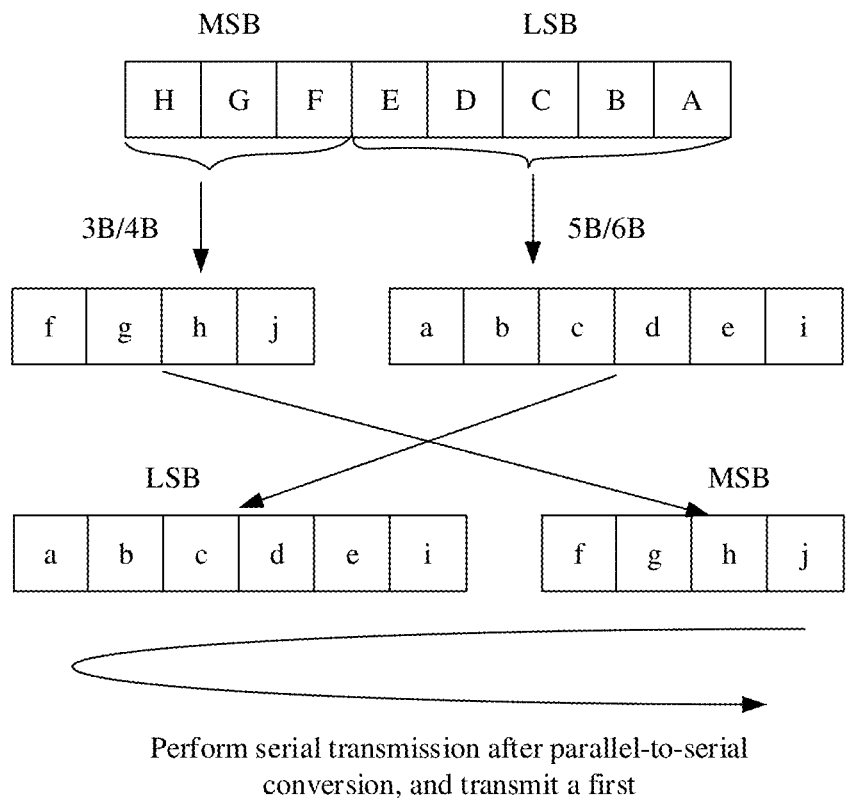
FIG. 7 is a schematic diagram of an 8B/10B correspondence according to an embodiment of this application.

As shown in FIG. 7, generally, if a character HGFEDCBA is used to represent an 8-bit binary numeral before encoding, low-order 5 bits are EDCBA, and high-order 3 bits are HGF. A 6-bit binary numeral after 5B/6B encoding is represented by abcdei, a 4-bit binary numeral after 3B/4B encoding is represented by fghj, and a finally combined 10-bit binary numeral is abcdeifghj. 8-bit data is usually represented in a form of "Dx.y", and a control code is represented in a form of "Kx.y", where D represents a data code, K represents a special command code, x represents low-order 5 bits EDCBA of input original data, and y represents high-order 3 bits HGF of the input original data. Further, x=5LSB (least significant bit is a least significant bit), and y=3MSB (most significant bit is a most significant bit).

8B/10B encoding is an encoding mechanism currently used by many high-speed serial buses, for example, buses or networks such as USB3.0, 1394b, Serial ATA, PCI Express, Infini-band, Fiber Channel, and RapidIO.

Figure 8:
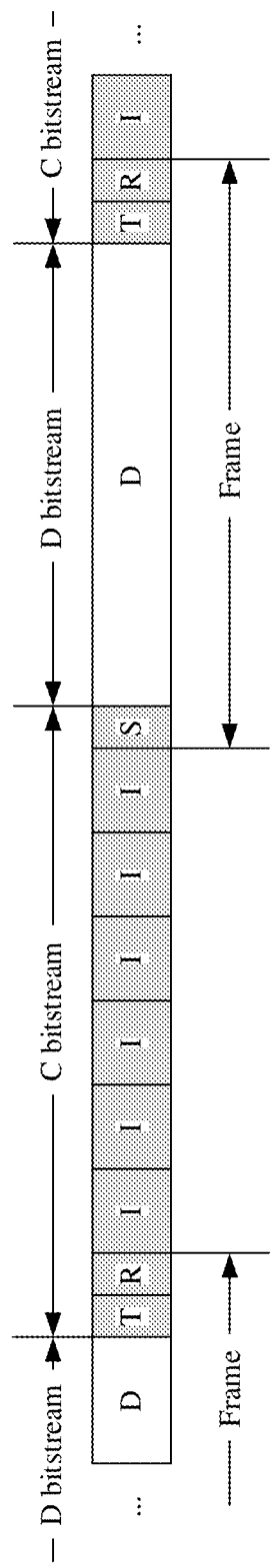
FIG. 8 is a schematic structural diagram of a typical 8B/10B bitstream according to an embodiment of this application.

In the embodiments of this application, a characteristic of an 8B bitstream obtained after decoding is performed based on typical 8B/10B encoding services such as an Ethernet (ETH) service and a fibre channel (FC) service is as follows:

As shown in FIG. 8, the 8B service bitstream may be considered as sending of a string of consecutive control codes and a string of consecutive data codes in an interleaved manner. A payload carried in a service is a D bitstream, namely, a data bitstream, and another bitstream including IDLE ("I" for short) is a C bitstream, namely, a control bitstream.

In addition, as shown in FIG. 8, a structure of a frame may include an S code, a D code, a T code, and an R code. The D code is a data code, and another block is a control code.

Currently, an encoding type and an encoding scheme of a control code are shown in Table 1.

TABLE 1

| Encoding type Code | Ordered set Ordered set | Quantity of code groups No.of code-groups | Encoding scheme Encoding |
|---|---|---|---|
| /C/ | Configuration code Configuration | | Alternating /C1/ and /C2/ |
| /C1/ | Configuration code 1 | 4 | /K28.5/D21.5/Config_Reg |
| /C2/ | Configuration code 2 | 4 | /K28.5/D2.2/Config_Reg |
| /I/ | Idle code IDLE | | Select /I1/ or /I2/ based on an RD |
| /I1/ | Idle code 1 | 2 | /K28.5/D5.6/ |
| /I2/ | Idle code 2 Packet encapsulation code Encapsulation | 2 | K28.5/D16.2/ |
| /R/ | Carrier extension code | 1 | /K23.7/ |
| /S/ | Packet start code | 1 | /K27.7/ |
| /T/ | Packet end code | 1 | /K29.7/ |
| /V/ | Error propagation code | 1 | /K30.7/ |
| /LI/ | Low-power idle code LPI | | Select /LI1/ or /LI2/ based on an RD |
| /LI1/ | Low-power idle code 1 | 2 | /K28.5/D6.5/ |
| /LI2/ | Low-power idle code 2 | 2 | /K28.5/D26.4/ |

In a control bitstream shown in Table 1, control code types defined in the gigabit Ethernet (GE) protocol include only seven types: /C/, /I/, /R/, /S/, /T/, /V/, and/LI/. Further, based on content of an ordered set, configuration codes (Configuration, C) include a configuration code C1 and a configuration code C2, where encoding corresponding to the configuration code C1 is K28.5 and D21.5, and encoding corresponding to the configuration code C2 is K28.5 and D2.2. Idle codes (IDLE, I) may include an idle code I1 and an idle code I2, which may be respectively encoded as K28.5/D5.6 and K28.5/D16.2. For ordered sets of other control codes, refer to an encoding rule shown in Table 1. Examples are not given one by one in this embodiment.

Control code types of 8B/10B bitstreams of an Ethernet service and a fibre channel service are limited. A typical structure is K code+D codexn (n<4), where n represents a quantity of D codes. Currently, there are a total of 12 control code "K code" types defined in the 8B/10B encoding specification: K28.0, K28.1, K28.2, K28.3, K28.4, K28.5, K28.6, K28.7, K23.7, K27.7, K29.7, and K30.7. As shown in Table 2, the foregoing limited types of K codes may be further re-encoded, for example, compressed, to obtain remaining space to indicate a bitstream type or indicate a boundary between a control code and a data code.

TABLE 2

| Code group name Code Group Name | Octet value Octet value | Octet bit value Octet Bits HGF EDCBA | Current running deviation (RD) − abcdei fghj | Current running deviation (RD) + abcdei fghj |
|---|---|---|---|---|
| K28.0 | 1C | 000 11100 | 001111 0100 | 110000 1011 |
| K28.1 | 3C | 001 11100 | 001111 1001 | 110000 0110 |
| K28.2 | 5C | 010 11100 | 001111 0101 | 110000 1010 |
| K28.3 | 7C | 011 11100 | 001111 0011 | 110000 1100 |
| K28.4 | 9C | 100 11100 | 001111 0010 | 110000 1101 |
| K28.5 | BC | 101 11100 | 001111 1010 | 110000 0101 |
| K28.6 | DC | 110 11100 | 001111 0110 | 110000 1001 |
| K28.7 | FC | 111 11100 | 001111 1000 | 110000 0111 |
| K23.7 | F7 | 111 10111 | 111010 1000 | 000101 0111 |

TABLE 2-continued

| Code group name Code Group Name | Octet value Octet value | Octet bit value Octet Bits HGF EDCBA | Current running deviation (RD) − abcdei fghj | Current running deviation (RD) + abcdei fghj |
| --- | --- | --- | --- | --- |
| K27.7 | FB | 111 11011 | 110110 1000 | 001001 0111 |
| K29.7 | FD | 111 11101 | 101110 1000 | 010001 0111 |
| K30.7 | FE | 111 11110 | 011110 1000 | 100001 0111 |

The following describes technical solutions of this application with reference to accompanying drawings. An embodiment of this application provides a transcoding method, to convert an original 8B/10B bitstream into a 64B/66B bitstream of a predetermined structure, so that indication information indicating a boundary between a control code and a data code in the original bitstream can be reduced, and block transparency can be further included. The block transparency may be understood as that content information carried in a block before and after transcoding keeps unchanged and can be identified by a receive end and a transmit end.

Specifically, in the technical solutions provided in the embodiments of this application, 10B encoding in an 8B/10B bitstream is first converted into 8B encoding to eliminate 20% fixed overheads of a 10B encoding scheme, and then the transcoded 8B bitstream is filled into a 64B block in a 64B/66B bitstream, to achieve efficient transcoding and reduce overheads.

In addition, to ensure that information obtained after the transcoding can be identified, that is, achieve a block transparency effect, a mapping correspondence between eight consecutive 8-bit block units and one 64-bit block unit is further established, and an indicator is configured in each block unit to indicate a status of a control code or a data code of an adjacent block, so that a boundary between a data code and a control code in an original bitstream is determined without increasing extra overheads.

Figures 9A, 9B, 9C, 9D, 9E, 10:
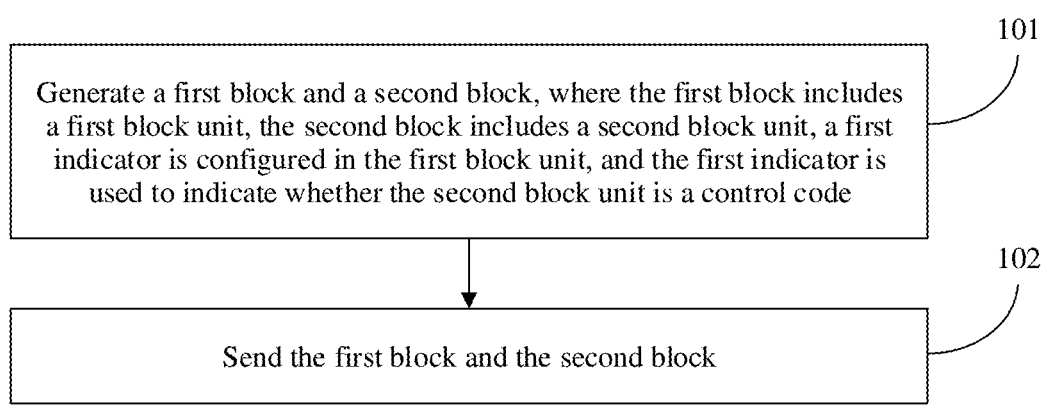
FIG. 9a is a schematic structural diagram of a T7 block according to an embodiment of this application.
FIG. 9b is a schematic structural diagram of an S0 block according to an embodiment of this application.
FIG. 9c is a schematic structural diagram of a D block according to an embodiment of this application.
FIG. 9d is a schematic structural diagram of an O block according to an embodiment of this application.
FIG. 9e is a schematic structural diagram of an IDLE block according to an embodiment of this application.
FIG. 10 is a flowchart of a block generation method according to an embodiment of this application.

A block of a specific structure is selected based on 64B/66B encoding shown in FIG. 3 to configure an indicator, and a mapping relationship between eight 8-bit blocks and one 64-bit block is established. Specifically, as shown in FIG. 9a to FIG. 9e, five structures of blocks with fixed 66B bits are listed, including a T7 block (as shown in FIG. 9a), an S0 block (as shown in FIG. 9b), an O block (as shown in FIG. 9d), an IDLE block (as shown in FIG. 9e), and a D block (as shown in FIG. 9c).

Further, the T7 block, the S block, the O block, and the IDLE block are control codes, and are indicated by using a 2-bit synchronization header (sync) "10". "10" indicates that the following 64 bits are a mixture of data and control information, the data may be carried by using a data code ("D code" for short), and the control information may be carried by using a control code ("K code" for short), where 8 bits next to the synchronization header represent a type field, and the following 56 bits are a control code, a data code, or a mixture of the two.

For example, as shown in Table 1, a control code I in a C bitstream carries a mixture of control information and data. Further, the control code I may be encoded as K28.5/D5.6 or K28.5/D16.2. K28.5 carries the control information, and may be referred to as a control code or a "K" code. D5.6 or D16.2 carries the data, and may be referred to as a data code or a "D" code. That is, the control code I may be represented by a "K code+D code" structure. Similarly, a synchronization header "01" indicates that the block is a data code, and all 64 bits following the synchronization header "01" carry data, and may be referred to as a data code or a D code.

It should be noted that, in the embodiments of this application, for a control code of the "K code+D code" structure, or a control code including one K code and a plurality of D codes, a boundary between a D code and a K code is a "small boundary". In an original bitstream shown in FIG. 8, a boundary between a D bitstream and a C bitstream is referred to as a "large boundary". The D bitstream includes a plurality of 8-bit data codes, and the C bitstream includes different types of control codes. In the embodiments of this application, unless otherwise specified, "the determining a boundary between a control bitstream and a data bitstream" is determining a "large boundary" between a D bitstream and a C bitstream.

An embodiment provides a block generation method, to reduce overheads of indication information in an original bitstream. The method may be performed by an adaptation unit, for example, a uAdpt, or may be performed by another network element device including an adaptation unit, for example, an interface chip in an interface board. This is not limited in this embodiment of this application.

Specifically, as shown in FIG. 10, the method includes the following steps:

Step 101: Generate a first block and a second block, where the first block includes a first block unit, the second block includes a second block unit, a first indicator is configured in the first block unit, and the first indicator is used to indicate whether the second block unit is a control code.

Step 102: Send the first block and the second block.

Figure 11A:
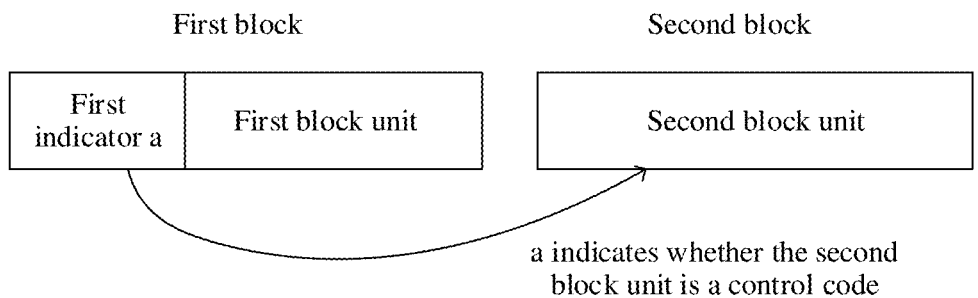
FIG. 11a is a schematic diagram of a block structure according to an embodiment of this application.
Figure 11B:
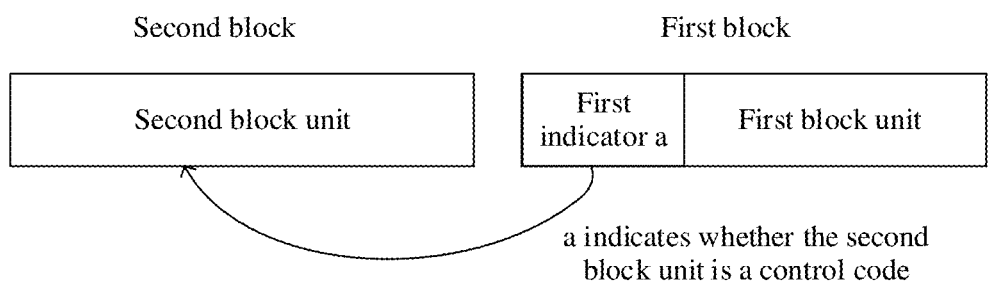
FIG. 11b is a schematic diagram of another block structure according to an embodiment of this application.

Optionally, a position relationship between the first block and the second block is as follows: As shown in FIG. 11a, the first block is before the second block; and as shown in FIG. 11b, the first block is after the second block.

Optionally, the first indicator is represented by "a", and occupies 1 bit. The first block unit includes N 8-bit data blocks, where N is greater than or equal to 1 and is a positive integer. Similarly, the second block unit also includes N 8-bit data blocks, where N is greater than or equal to 1.

Referring to FIG. 11a, if the first block is before the second block, the first indicator a in the first block unit is used to indicate whether a second block unit of the latter block is a control code. Referring to FIG. 11b, if the first block is after the second block, the first indicator a is used to indicate whether a second block unit of the former block is a control code.

Specifically, in a possible indication manner, if content of the first indicator a is "1", it indicates that the block unit indicated by the first indicator a is a control code; or if the content of the first indicator a is "0", it indicates that the block unit indicated by the first indicator a is a data code, that is, a data code in a D bitstream.

The first block and the second block may be adjacent, or may not be adjacent.

Optionally, the first block and the second block each are a 64B/66B block, and the first block and the second block may further include another block unit.

Figure 11C:
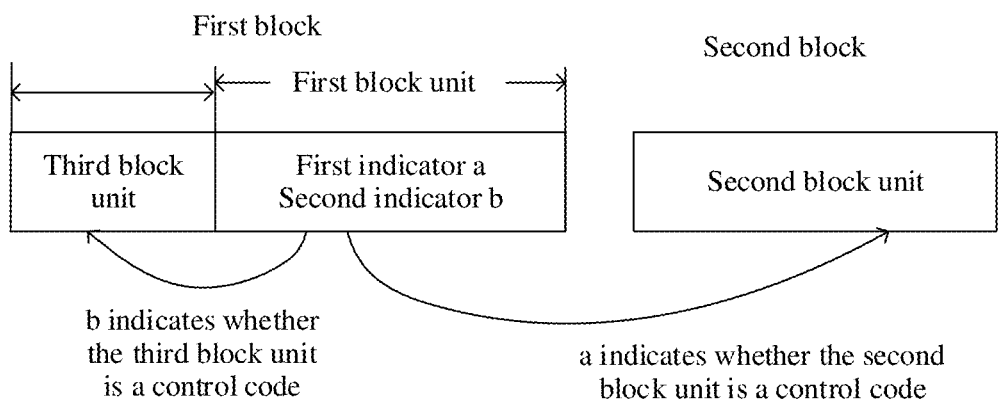
FIG. 11c is a schematic diagram of still another block structure according to an embodiment of this application.

In a possible implementation of this embodiment, the first block further includes a third block unit, and the third block unit is before the first block unit. As shown in FIG. 11c, a second indicator is further configured in the first block unit, and the second indicator is used to indicate whether the third block unit before the first block unit is a control code.

Figure 11D:
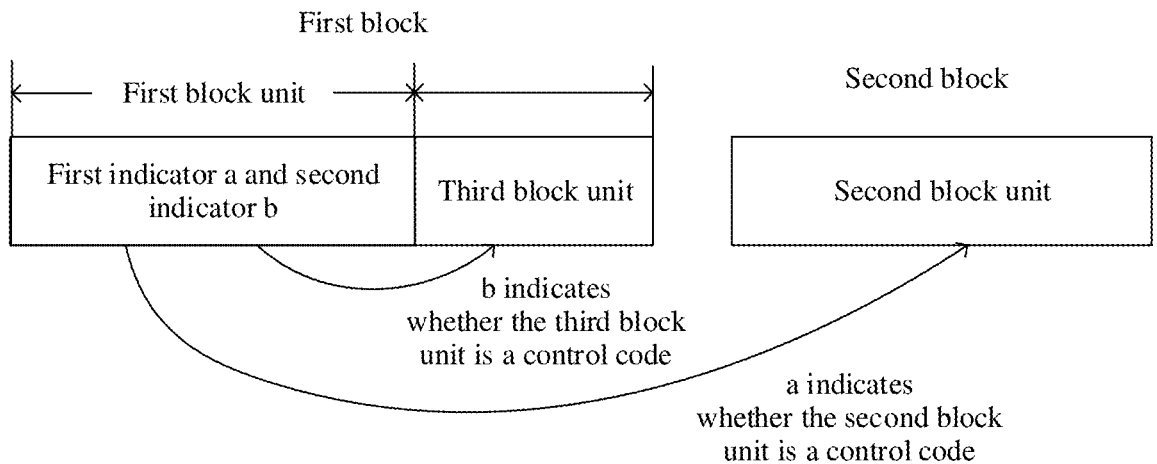
FIG. 11d is a schematic diagram of still another block structure according to an embodiment of this application.

Optionally, as shown in FIG. 11d, the third block unit may be alternatively configured after the first block unit, and the second indicator is used to indicate whether the third block unit is a control code.

Optionally, the second indicator is represented by "b", and occupies 1 bit.

In another possible implementation of this embodiment, the first block and the second block each may be a data code, or a control code that is a mixture of data and control information. For example, the control code includes one K code, or includes one K code and at least one D code. The D code is a data code, and is used to indicate a type of the K code. For example, a Di code indicates that the K code is an IDLE control code. If the first block unit is a control code, a third indicator is further configured in the first block unit, and the third indicator is used to indicate a quantity of D codes in the first block unit.

Figure 11E:
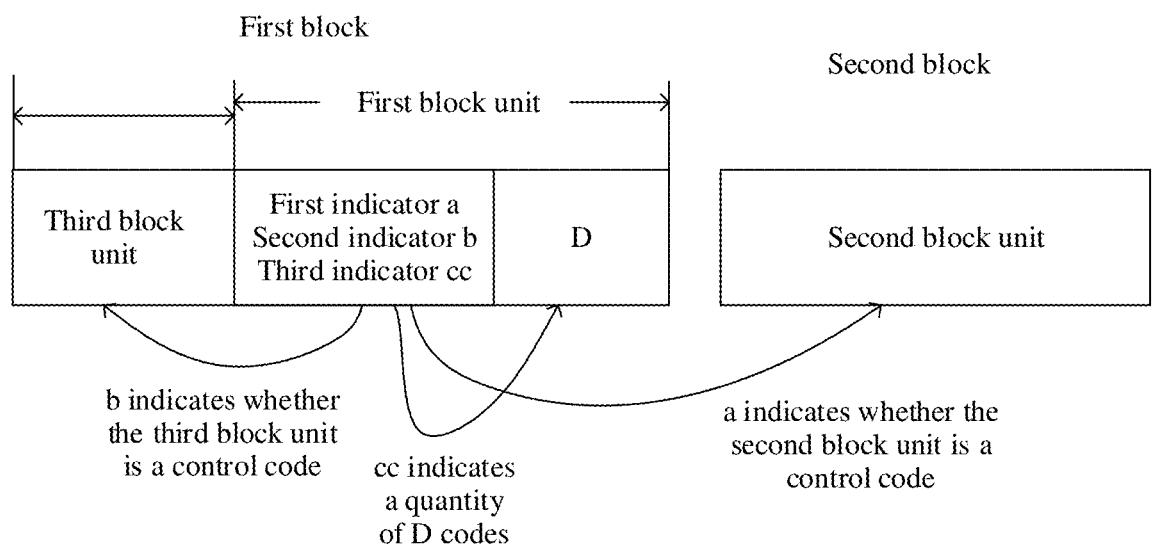
FIG. 11e is a schematic diagram of still another block structure according to an embodiment of this application.

Optionally, as shown in FIG. 11e, the third indicator is used to indicate that there is one D code in the first block unit. In addition, the quantity of D codes in the first block unit may be alternatively 0, 1, 3, or 7.

Optionally, the third indicator is represented by "cc", and occupies 2 bits.

Figure 11F:
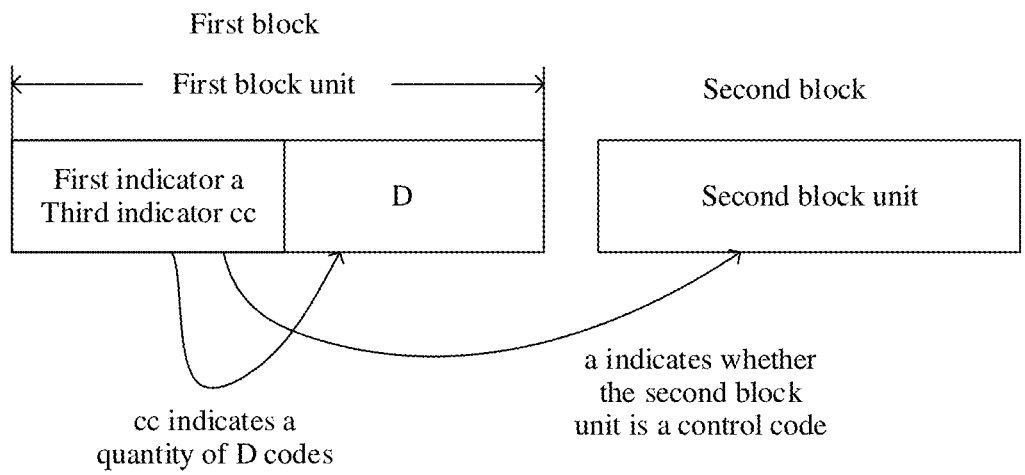
FIG. 11f is a schematic diagram of still another block structure according to an embodiment of this application.

Optionally, based on the structure shown in FIG. 11a, this embodiment further provides a block structure. As shown in FIG. 11f, the block structure includes a first block and a second block. The first block includes a first block unit, and the second block includes a second block unit. The first block unit includes a control code "K code" and a data code "D code", and a first indicator a and a third indicator cc are configured in the control code "K code". The first indicator a is used to indicate whether the second block unit is a control code, and the third indicator cc is used to indicate a quantity (or length) of D codes in the first block unit. In this example, there is one D code in the first block unit.

In still another possible implementation of this embodiment, based on the foregoing block structure, the second block further includes a fourth block unit, the fourth block unit is after the second block unit, at least one indicator is configured in the second block unit, and the at least one indicator is used to indicate whether the fourth block unit is a control code and indicate whether the first block unit is a control code; and if the second block unit is a control code, the at least one indicator is further used to indicate a quantity of D codes in the second block unit.

Figure 11G:
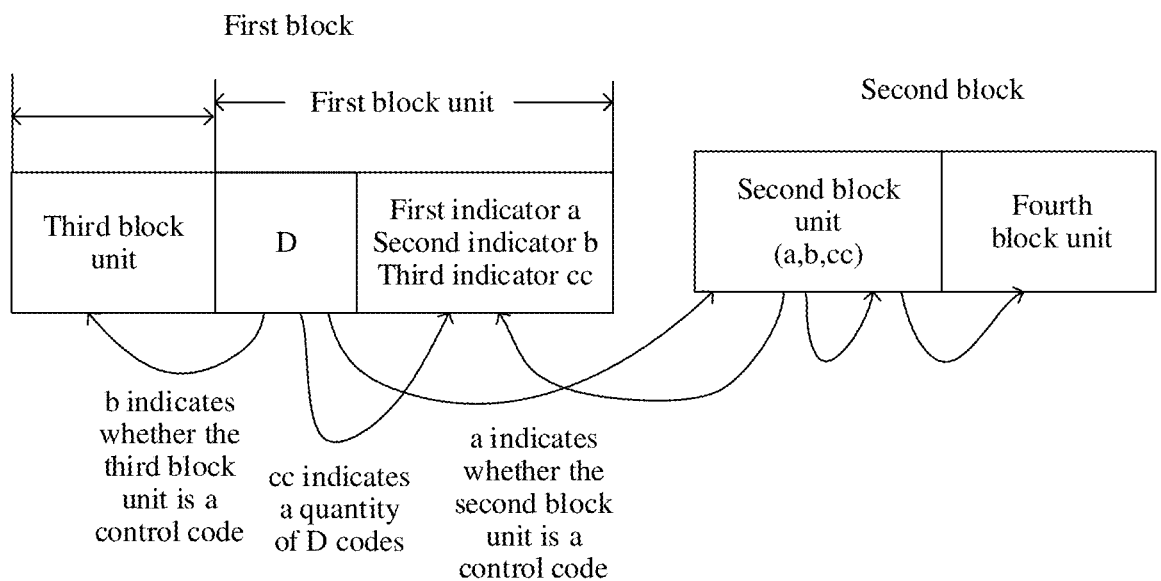
FIG. 11g is a schematic diagram of still another block structure according to an embodiment of this application.

Further, the following cases are included:

Case 1:

As shown in FIG. 11g, in a block structure in this embodiment, a second block includes a second block unit and a fourth block unit, and the second block unit includes indicators a, b, and cc. Further, the indicator a in the second block unit is used to indicate whether a first block unit is a control code, the indicator b is used to indicate a quantity of D codes in the second block unit, and the indicator cc is used to indicate whether the fourth block unit is a control code.

Figure 11H:
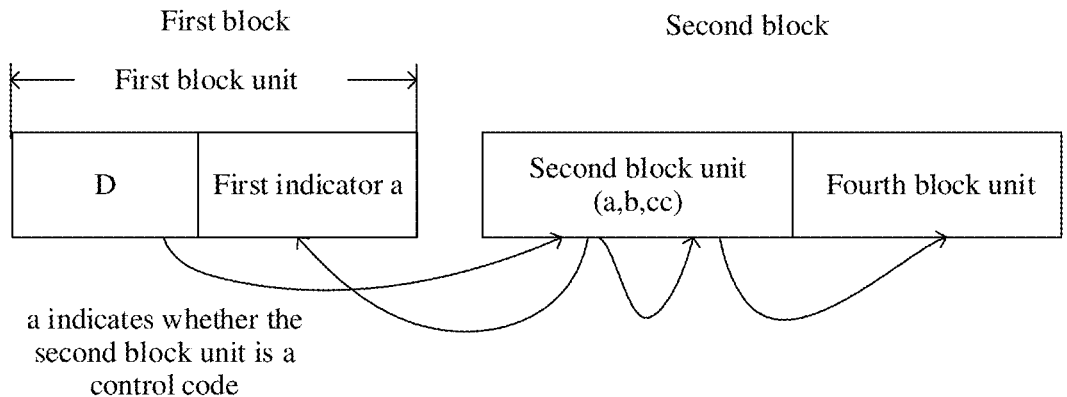
FIG. 11h is a schematic diagram of still another block structure according to an embodiment of this application.

Case 2:

As shown in FIG. 11h, in another block structure in this embodiment, a second block includes a second block unit and a fourth block unit, and the second block unit includes indicators a, b, and cc. A first block includes a first block unit, the first block unit includes one control code "K code" and one data code "D code", and a first indicator a is configured in the control code "K code".

Figure 11I:
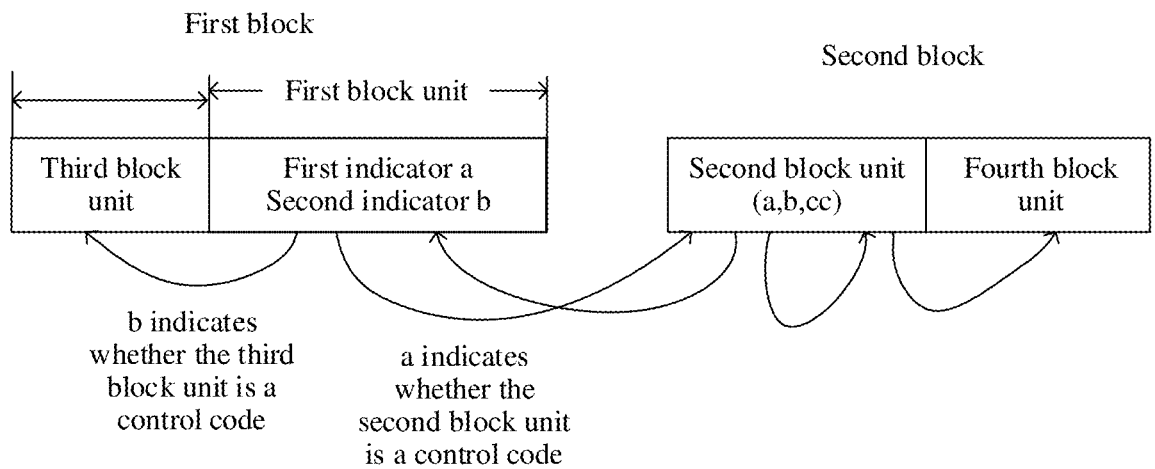
FIG. 11i is a schematic diagram of still another block structure according to an embodiment of this application.

Case 3:

As shown in FIG. 11i, in still another block structure in this embodiment, a structure of a second block is the same as the structures in FIG. 11g and FIG. 11h, and details are not described again. A first block includes a first block unit and a third block unit, the first block unit includes a first indicator a and a second indicator b, the first indicator a is used to indicate whether a second block unit is a control code, and the second indicator b is used to indicate whether the third block unit is a control code.

Figure 11J:
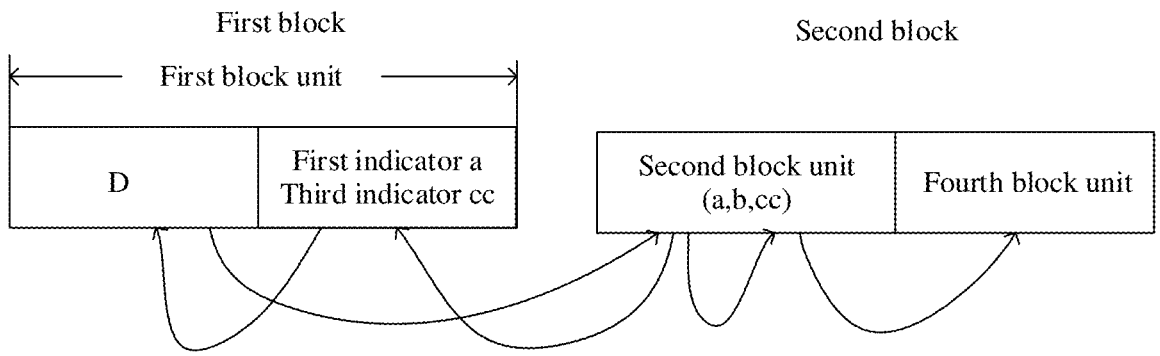
FIG. 11j is a schematic diagram of still another block structure according to an embodiment of this application.

Case 4:

As shown in FIG. 11j, in still another block structure in this embodiment, a structure of a second block is the same as the structures in FIG. 11g to FIG. 11j, and details are not described again. A difference lies in that a first block includes a first block unit, and the first block unit includes one K code and at least one D code. Further, a first indicator a and a third indicator cc are configured in the K code, the first indicator a is used to indicate whether a second block unit is a control code, and the third indicator cc is used to indicate a quantity of D codes in the first block unit. In this embodiment, there is one D code.

It should be noted that, in the foregoing cases, because the second indicator b in the second block unit is used to indicate whether a first block unit of a previous block is a control code, and the first block unit includes one K code and at least one D code, the last unit in the generated first block unit is the K code that is used to carry at least one indicator. For example, if the first block is a T7 control block, the last position "D6" of the T7 block is set as the K code, and is correspondingly interchanged with a position of the data code D, so that the second indicator b in the second block unit indicates that the first block unit is a control code.

In addition, in various block structures in this embodiment, more blocks such as a third block and a fourth block may be further generated. Each block may include at least one block unit, and an indicator may be configured in each block unit to indicate, level by level, whether an adjacent block unit is a control code. Finally, a large boundary between a control code and a data code in an original bitstream can be determined.

In this embodiment, only the first block, the second block, the first block unit and the third block unit in the first block, and configuration and indication cases of indicators of the second block unit and the fourth block unit in the second block are listed. If other blocks such as the third block and the fourth block are generated, for a specific structure of a generated block and configuration of an indicator, refer to the foregoing method for generating the first block and the second block and indication cases. Examples are not listed one by one in this embodiment.

Optionally, in step 101, the generating a first block and a second block includes: obtaining a first bitstream, where the first bitstream includes a control code, for example, the first bitstream is an 8B bitstream; and compressing the control code in the first bitstream, configuring a first indicator in remaining block space after the compression, and generating the first block and the second block.

The control code in the first bitstream includes at least one 8-bit block unit.

Further, the compressing the control code in the first bitstream, configuring a first indicator in remaining block space after the compression, and generating the first block and the second block includes: compressing one 8-bit block unit in the first bitstream to obtain N-bit remaining space, where $N \leq 8$; configuring the first indicator in the N-bit remaining space, and filling the N-bit remaining space with one 8-bit K code; and generating the first block and the second block based on the 8-bit K code.

Optionally, a second indicator and a third indicator may be further configured in a process of generating the 8-bit K code.

Similarly, in the generated second block, at least one indicator may be configured in a K code of the second block unit to indicate whether an adjacent block unit is a control code.

Figure 12:
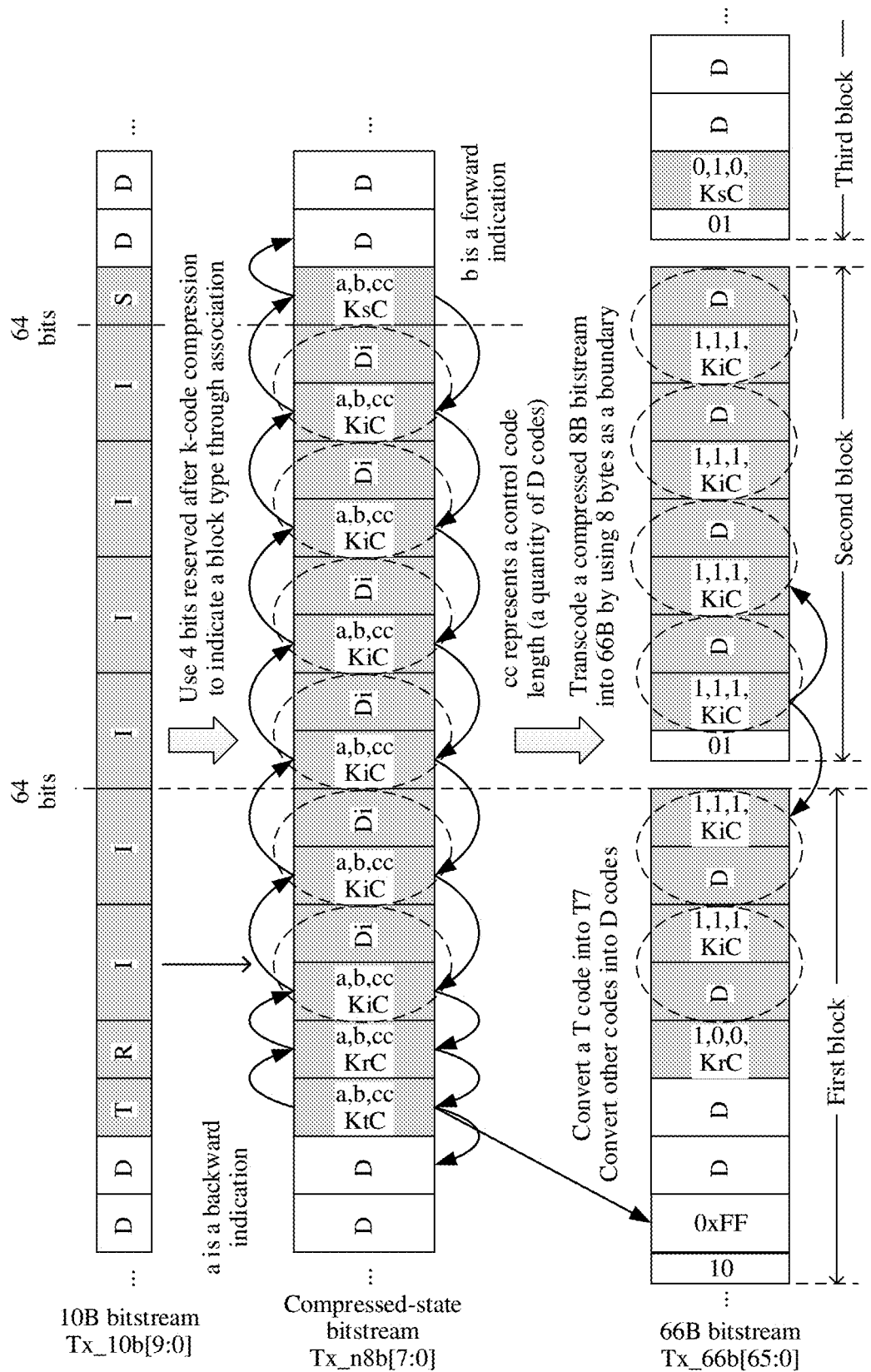
FIG. 12 is a schematic diagram of a processing procedure of transcoding a 10B bitstream into a 64B/66B bitstream according to an embodiment of this application.

As shown in FIG. 12, the method for compressing a block to generate the first block and the second block specifically includes the following step.

Step 1: Obtain the first bitstream, where the first block may be an original 8B/10B bitstream, and the original 8B/10B bitstream includes a data code "D code" and a control code, for example, a type of the control code is a T/R/I/S code.

The original 8B/10B bitstream is decoded into an 8B bitstream, and indication information is generated, where the indication information is used to indicate a control block and a data block in the 8B bitstream.

Figure 13:
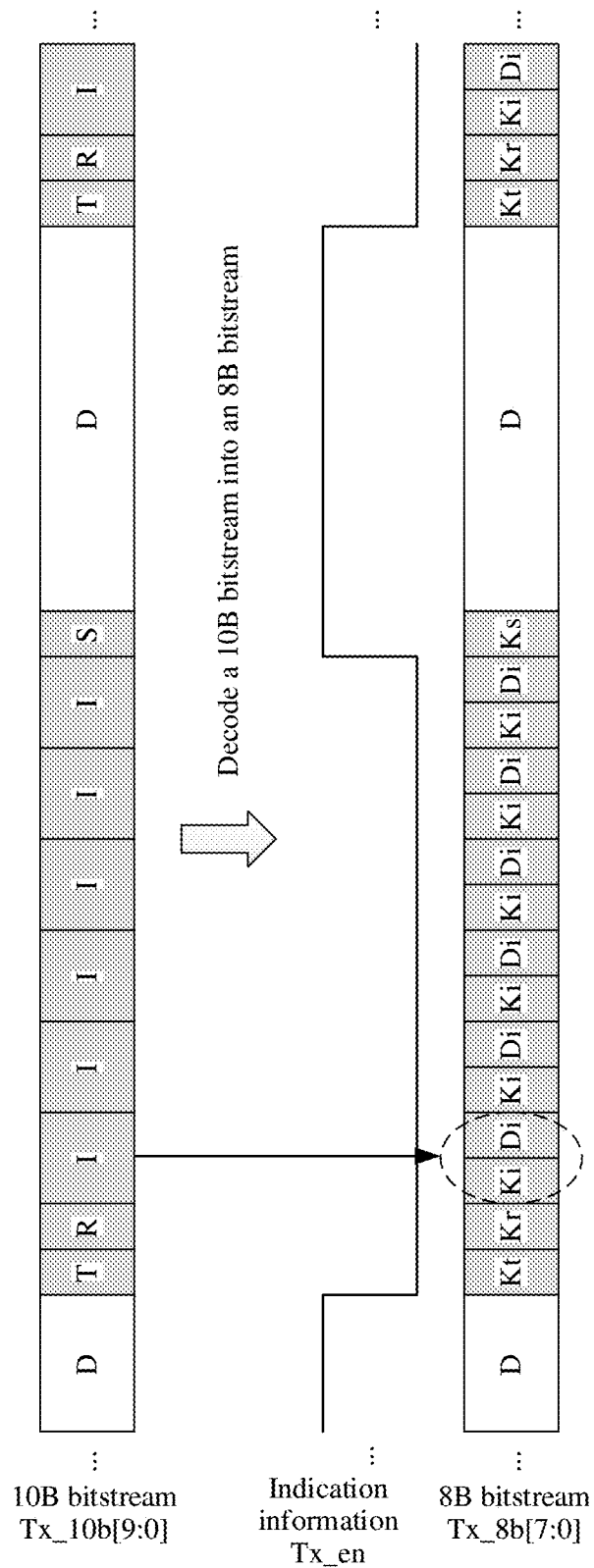
FIG. 13 is a schematic diagram of a processing procedure of transcoding a 10B bitstream into an 8B bitstream according to an embodiment of this application.

As shown in FIG. 13, based on an 8B/10B bitstream encoding rule, an original 10B bitstream Tx_10 b[9:0] is decoded into an 8B bitstream Tx_8 b[7:0] and 1-bit indication information Tx_en. In this manner, 25% fixed extra overheads of 10B encoding can be eliminated.

In addition, based on characteristics of typical 8B/10B encoding services such as a low-speed Ethernet service and a low-speed fibre channel service, a service bitstream is obtained by combining a string of consecutive control blocks and a string of consecutive data blocks that are sent in an interleaved manner. Each control code includes K code+D code×n (n<4).

In a typical GE service stream, control codes T, R, and S are respectively indicated by /K29.7/, /K23.7/, and /K27.7/, and are respectively represented by Kt, Kr, and Ks in FIG. 13, and a control code I is indicated by/K28.5/D5.6/or/ K28.5/D16.2/, and is represented by Ki+Di in the figure.

As shown in FIG. 12, the method further includes the following step.

Step 2: Compress the control code in the decoded 8B bitstream to obtain an intermediate-state bitstream structure.

Specifically, a K code in the 8B bitstream is compressed into a 4-bit indication, for example, KtC/KrC/KiC/KsC, based on 12 K code types defined in the 8B/10B bitstream. KtC/KrC/KiC/KsC each occupies 4 bits, and remaining high-order 4 bits may be used to configure other information to indicate other meanings, so that a size of each block unit is finally 8 bits.

Further, the remaining high-order 4 bits are reserved as indicators of other meanings. As shown in FIG. 12, the remaining high-order 4 bits after the compression may be configured based on indicators a, b, and cc. For example, each of "a" and "b" is configured as 1 bit, and "cc" is configured as a 2-bit indicator. An indicator Tx_en in the 8B bitstream may be carried on bandwidth of the 8B bitstream by using the three indicators, thereby reducing overheads of the indication information.

Optionally, meanings of the indicators are configured as follows:

The first indicator a is 1 bit and is used to indicate whether a next block unit of a current block unit is a control code.

If the first indicator a is "1", it indicates that the next block unit of the current block unit is a control code. If the first indicator a is "0", it indicates that the next block unit is a data code "D code" instead of a control code.

The second indicator b is 1 bit and is used to indicate whether a previous block unit of the current block unit is a control code.

If the second indicator b is "1", it indicates that the previous block unit of the current block unit is a control code. If the second indicator b is "0", it indicates that the previous block unit is a data code "D code" instead of a control code.

The third indicator cc is 2 bits and is used to indicate a length of the current block unit or indicate a quantity of D codes in a block unit in which the third indicator is located.

Generally, the control code includes a K code, or includes one K code and n D codes, and the quantity of D codes and the third indicator cc meet the following relational expression: $n=2^{cc}-1$.

1 indicates that the K code occupies one 8-bit block unit, and Table 3 may be obtained based on the relational expression.

TABLE 3

| Third indicator cc | n (Quantity of D codes) | Structure (Code) of a block unit |
| --- | --- | --- |
| 0 | 0 | K |
| 1 | 1 | K + D |
| 2 | 3 | K + D + D + D |
| 3 | 7 | K + D + D + D + D + D + D + D |

Referring to Table 3, when values of the third indicator cc are 0, 1, 2, and 3, corresponding quantities of D codes are 0, 1, 3, and 7.

Indicators a, b, and cc of each block are configured in the remaining 4-bit space after the compression, and are used for association and indication of a status of a control code or a data code of an adjacent block unit.

Step 4: Map each indicator of the compressed-state bitstream to a corresponding specific block structure based on a specific block structure in a 64B/66B bitstream, to form a 100GE standard 64B/66B bitstream.

The 100GE standard 64B/66B bitstream includes at least two blocks, for example, a first block and a second block, and a length of each block is 64 bits. Further, the first block and the second block include but are not limited to the following cases:

The first block is a T7 block, and the second block is a D block; or the first block is an S0 block, and the second block is a D block; or the first block is an O block, and the second block is a D block; or the first block is an IDLE block, and the second block is a D block.

The T7 block, the S0 block, the O block, and the IDLE block are control codes, and the D block is a data code.

In addition, it should be noted that the first block may be alternatively a D block, and the second block may be any control code of a T7 block, an S0 block, an O block, and an IDLE block, or may be a block of another type. Block structures of the first block and the second block are not specifically limited in this embodiment of this application.

It should be noted that a structure of a block in the generated 64B/66B bitstream in this embodiment of this application includes but is not limited to various block structures such as S0+D, D+T, 0+D, and S0+D+T. In this embodiment, only some relatively common cases are listed, and other combination cases may be further included. This is not limited in this application.

According to the method provided in this embodiment, a bitstream with a specific block structure is generated, the bitstream includes a first block and a second block, and at least one indicator is configured in each block to indicate whether an adjacent block unit is a control code, so that a boundary between a control code and a data code in an original bitstream is determined, thereby reducing overheads of extra indication information.

For example, as shown in FIG. 12, the first block is a T7 block, the second block is a D block, and the first block includes two 8-bit data codes and several block units. Further, a type field 0xFF of the T7 block replaces the 1st block unit "a,b,cc, KtC" of the control code in the compressed-state bitstream, and "a,b,cc, KtC" corresponds to a control code T in the original 10B bitstream, as shown by an arrow. The 2nd block unit "a,b,cc, KrC" in the compressed-state bitstream is configured at a position D2 in the T7 block, and corresponds to a control code R in the original 10B bitstream. The 3rd block unit includes one K code and one D code, the K code is "a,b,cc, KiC", the D code is "Di", and "a,b,cc, KiC" and "Di" correspond to a control code IDLE in the original 10B bitstream. Similarly, remaining control codes IDLE in the original 10B bitstream are all compressed and configured as a block unit including one K code and one D code.

The first block generated by using the foregoing method includes the following block units: a data code "D code", a first block unit, a second block unit, and a third block unit. The first block unit includes one K code that occupies 8 bits, the second block unit includes one K code and one D code that occupy 16 bits, and the third block unit also includes one K code and one D code that occupy 16 bits.

Further, three indicators are configured in the K code in the first block unit, and are "1,0,0" in an order of "a,b,cc". "1" is used to indicate that the second block unit is a control code, "0" is used to indicate that a previous block unit of the first block unit is a data code, and "0" is used to indicate that a quantity of data codes in the first block unit is zero, that is, only one K code is included, and a length of the K code is 8 bits. Based on the second indicator b in the first block unit, it may be determined that a large boundary between a data code and a control code in the original 8B/10B bitstream is a boundary between a position D1 and the position D2 of the T7 block.

Similarly, both the second block unit and the third block unit in the first block are generated by compressing a control code IDLE in the original 8B/10B bitstream, and each IDLE code includes one KiC code and one Di code. "i" in the "Di" code is used to indicate that a K code in which the "Di" code is located is an IDLE code (I for short), that is, indicate that a type of the control code is I.

In the generated first block, the second block unit includes "Di" and "a,b,cc, KiC", and each occupies 8 bits. The third block unit also includes "Di" and "a,b,cc, KiC", and each occupies 8 bits. It should be noted that, when positions of "Di" and "a,b,cc, KiC" are configured, because a second indicator b configured in the 1st block unit of the second block is used to indicate whether the last block unit of the first block is a control code, the last position D6 of the first block is configured as a control code "1,1,1, KiC". In this case, positions of "Di" and "a,b,cc, KiC" codes generated by the original compressed control code I are interchanged. Correspondingly, positions of "Di" and "a,b,cc, KiC" codes in the previous second block unit are also interchanged in comparison with the compressed-state bitstream.

As shown in FIG. 12, the second block includes four block units, each block unit is obtained by compressing a control code I in the original bitstream, and each block unit includes one KiC code and one Di code that occupy 16 bits in total. Further, three indicators "1,1,1" are configured for the KiC code in each block unit. Specifically, "1" indicates that a next block unit of a current block unit is a control code, "1" indicates that a previous block unit of the current block unit is a control code, and "1" indicates that a quantity of D codes in the current block unit is 1.

In addition, a third block is further included. The 1st block unit in the third block is "0,1,0, KsC" that occupies 8 bits, and is obtained by compressing and configuring a control code S in the original 10B bitstream. If a first indicator a is "0" and indicates that a next block is a data code, it is determined that a block unit following the 1st block unit in the third block is a control code.

According to the method provided in this embodiment, starting from a next block of the first block, that is, the 1st block unit of the D block, it is determined, one by one, whether block units are control codes based on first, second, and third indicators, to identify a boundary between a data code and a control code in the original 8B/10B bitstream, then a boundary between a control code and a data code is identified through association by using the indicators defined in step 3, and finally all bitstream information is identified, thereby avoiding separate configuration of indication information and generation of extra overheads.

A transcoding process provided in this embodiment is a general process, and only a T code in an original block needs to be specially identified. Theoretically, a transcoding problem of 8B/10B encoding of all frame structures can be generally resolved, and transcoding is performed to obtain a T+D structure of 100GE standard 64B/66B.

This embodiment provides a method for transparently transcoding 8B/10B into 64B/66B. First, a 10B bitstream is decoded into an 8B bitstream, thereby reducing 20% fixed overheads. Then, a control code of the decoded 8B bitstream is compressed, and at least one indicator is configured in remaining space after the compression to indicate statuses of a control code and a data code of an adjacent block, thereby reducing overheads of indication information and improving transcoding efficiency. Therefore, block loading utilization is increased by 25% compared with transparent bearing of a D block, and a boundary between a control code and a data code of an 8B/10B bitstream does not need to be restored. In this way, adjacent blocks are associated level by level based on an indication of remaining block overheads after a control code is compressed, thereby identifying a characteristic and a meaning of an entire bitstream.

In another embodiment of this application, corresponding to the foregoing block generation method, this embodiment provides a block receiving method. The method includes: receiving a first block and a second block, where the first block includes a first block unit, the second block includes a second block unit, and a first indicator is configured in the first block unit; and determining, based on an indication of the first indicator, whether the second block unit is a control code.

Optionally, in a possible implementation of this embodiment, the first block further includes a third block unit, the third block unit is before the first block unit, and a second indicator bit is further configured in the first block unit; and the method further includes: determining, based on an indication of the second indicator, whether the third block unit before the first block unit is a control code.

Optionally, in another possible implementation of this embodiment, the control code includes one K code, or includes one K code and at least one D code; and the method further includes: when it is determined that the first block unit is a control code, determining a quantity of D codes in the first block unit based on a third indicator in the first block unit.

Optionally, in still another possible implementation of this embodiment, the second block further includes a fourth block unit, the fourth block unit is after the second block unit, and at least one indicator is configured in the second block unit.

The method further includes: determining, based on the at least one indicator in the second block unit, whether the fourth block unit is a control code and whether the first unit block is a control code.

Optionally, in still another possible implementation of this embodiment, the determining, based on an indication of the first indicator, whether the second block unit is a control code includes: if the first indication information indicates that the second block unit is not a control code, determining that a data code starts from the second block unit.

In addition, if the block unit indicated by the first indication information is a control code, it is further determined whether an indicator in the second block unit indicates that a next block unit is a control code, until a non-control code is indicated.

In this embodiment, an indicator is configured in each block unit, so that it can be determined, based on an indication of the indicator, whether a block unit adjacent to a current block unit is a control code, and a boundary between a data code and a control code in an original bitstream is further determined, thereby avoiding generation of extra indication information and reducing overheads.

The following describes in detail a process of transcoding an 8B/10B bitstream of a GE service into a 64B/66B bitstream.

Embodiment 1

This embodiment provides a specific method for transcoding an 8B/10B bitstream of a GE service into a 64B/66B bitstream. As a typical Ethernet access service of multi-service bearing, the GE service uses 8B/10B encoding at a physical layer, and a type of a control code is shown in Table 1.

Figure 14A:
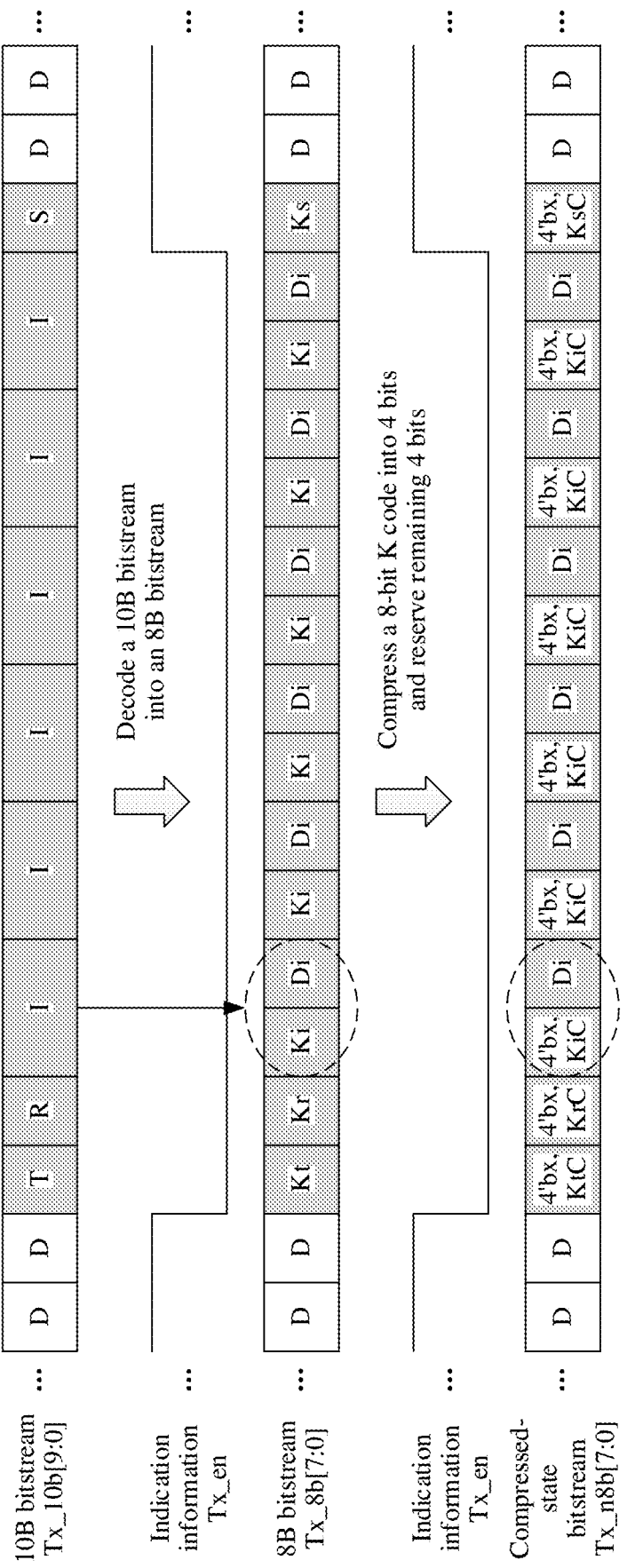
FIG. 14A and FIG. 14B are a schematic diagram of a processing procedure of transcoding an 8B/10B bitstream of a GE service into a 64B/66B bitstream according to an embodiment of this application.
Figure 14B:
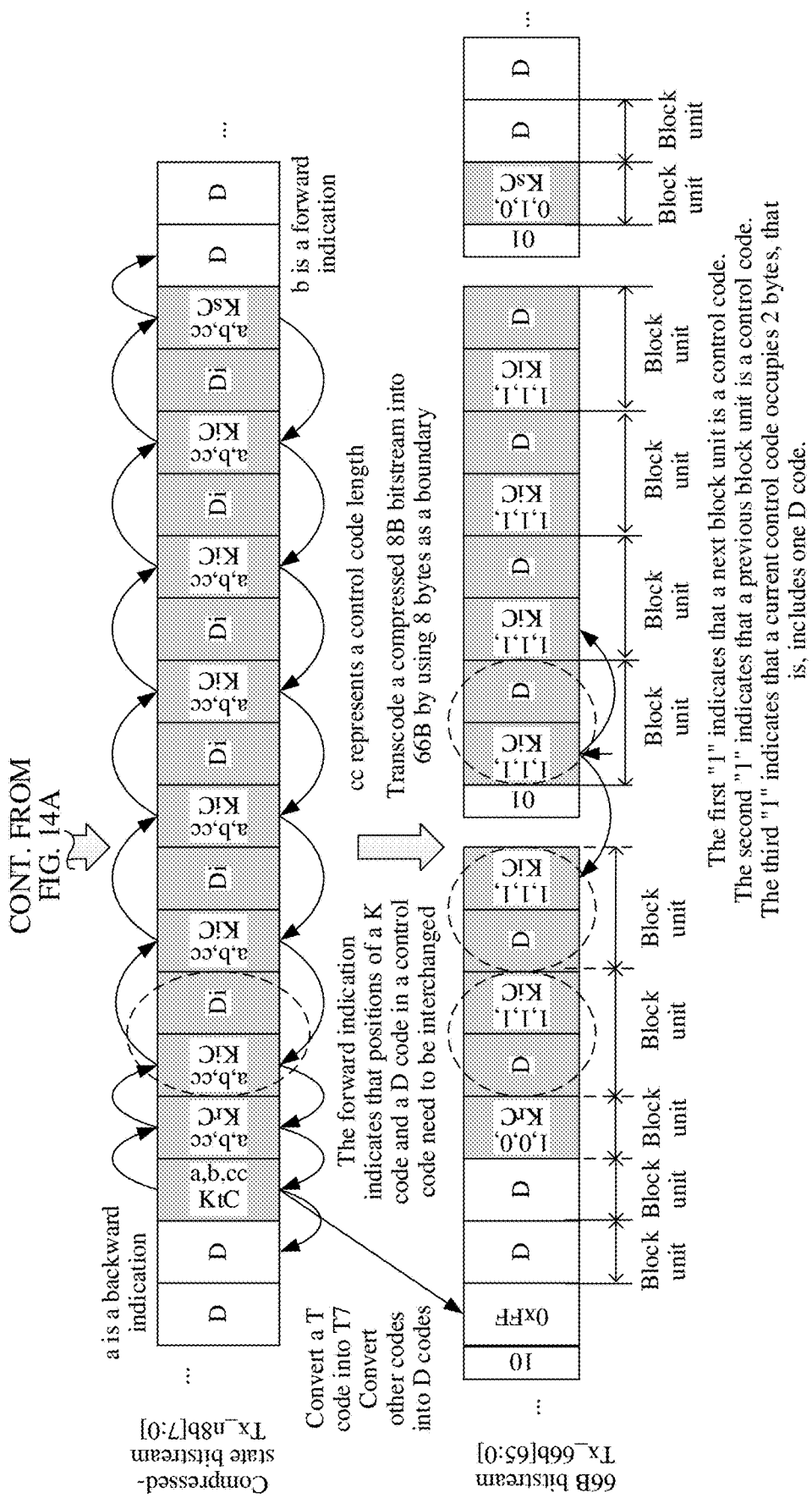

According to the core method procedure in the foregoing embodiment, the GE service may be transcoded into a T+D block structure of a 100GE standard 64B/66B bitstream. As shown in FIG. 14A and FIG. 14B, a main processing procedure is as follows:

Step 1: Obtain a 10B bitstream Tx_10b [9:0] in an original 8B/10B bitstream, where the 10B bitstream includes a control code and a data code.

Step 2: Decode the original 10B bitstream Tx_10 b[9:0] into an 8B bitstream Tx_8 b[7:0], and generate 1-bit indication information Tx_en, where the indication information is used to indicate whether the decoded 8B bitstream is a control code or a data code. For example, a high level in the indication information indicates that a block in the bitstream is a data code, and a low level indicates that a block in the bitstream is a control code.

Kt/Kr/Ks in the decoded 8B bitstream Tx_8 b[7:0] respectively represent three types of control codes: /T/R/S/, and/ Ki/Di/represent two pieces of 8-bit data constituting an/I/ code.

Step 3: Based on a characteristic of a service bitstream, because each control code includes K code+D code×n (n<4), the control code or the K code constituting the control code is compressed to obtain a compressed-state bitstream Tx_n8b[7:0], and the indication information Tx_en is reserved.

Referring to the foregoing 12 K code types included in Table 2, each 8-bit K code is compressed into 4 bits (a maximum of 12 types) and is represented by 4-bit KtC/KrC/ KiC/KsC. Remaining 4-bit space 4'bx is reserved for carrying at least one indicator, and it is still ensured that each finally generated K code is still 8 bits.

Step 4: Configure at least one indicator in remaining space after the compression, where the indicator is used to indicate whether an adjacent block unit is a control code.

Specifically, a method for configuring an indicator includes: configuring a first indicator a, a second indicator b, and a third indicator cc in the remaining 4-bit space, where the first indicator a is used to indicate whether a next block unit of a current block unit is a control code, the second indicator b is used to indicate whether a previous block unit of the current block unit is a control code, and the third indicator cc is used to indicate a length of the current block unit or indicate a quantity of D codes in a block unit in which the third indicator is located.

Generally, the control code includes a K code, or includes one K code and n D codes, and the quantity of D codes and the third indicator cc meet the following relational expression $n=2^{cc}-1$.

Step 5: Convert the compressed-state bitstream Tx_n8b [7:0] obtained after the compression and configured with an indicator into a 64B/66B bitstream with a predetermined structure.

Specifically, a process of transcoding into the 64B/66B bitstream with the predetermined structure is as follows:

Eight 8-bit blocks obtained after the compression and configured with indicators are combined into one 64-bit block, for example, a first block. Similarly, a 64-bit second block, a 64-bit third block, a 64-bit fourth block, and the like are generated. The first block generated after the transcoding may be a T7 block, and the second block may be a D block, or may be a block of another type, for example, an S0 block or an O block.

In this embodiment, an example in which the first block generated after the transcoding is a T7 block and the second block is a D block is used to describe structure characteristics of the first block and the second block and a principle of configuring an indicator. Details are as follows:

In this embodiment, the principle of configuring an indicator is: when a block including a T code in the original bitstream is transcoded into a T7 block, the indicator is used to identify a boundary between a D code and a control code in the original bitstream. The T code in the original bitstream is determined as a start control code, and is replaced with a type field (in T7, but does not participate in association. A subsequent K code is associated in an "a,b,cc" manner, and an indicator after compression of a control code following T7 is used to indicate whether T7 includes a control code. Blocks other than the block including the T code are transcoded into D codes, and control codes are all compressed in the foregoing manner, to indicate whether adjacent previous and next blocks are control codes.

According to the foregoing mechanism, an 8B/10B GE bitstream is transparently transcoded into a 100GE standard 64B/66B T+D block structure.

For example, a synchronization header "10" of the first block (the T7 block) indicates that the block is a control code including data and control information. A type field "0xFF" of the T7 block replaces the first K code "a,b,cc, KtC" in the compressed-state bitstream, and then a data code and a control code in the compressed-state bitstream are reserved after the type field "0xFF".

A synchronization header "01" of the second block (the D block) indicates that all subsequent content carried in the block is data. The first K code "1,1,1, KtC" in the D block is used to indicate whether the last block unit in the first block is a control code. Because positions of a K code and a D code in the control code need to be interchanged based on a forward indication and a backward indication, positions of a K code and a D code constituting a control code I in the first block need to be interchanged.

In the D block, it is specified that indicators of the 1st block unit following the synchronization header "01" include "1,1,1". The second "1" indicates that a next block unit of a current block unit is a control code, the second "1" indicates that a previous block unit of the current block unit (the last block unit in the T7 block) is a control code, and the third "1" indicates that a length of the current control code or block unit occupies 2 bytes, namely, 16 bits, or indicates that a control code "K code" is associated with one data code "D code" behind.

Starting from a second indicator b of the 1st block unit of the second block (the D block), it is determined, in a back-to-front indication order for the first block (the T7 block), that next three block units of the first block are all control codes, until a second indicator b being "0" of the third last block unit "1,0,0, KrC" indicates that a previous block unit is a data code. Therefore, it is determined that a boundary between a control code and a data code in the original 10B bitstream is that a control code starts from the 3rd block unit of the first block and a block unit before the 3rd block unit of the first block is a data code.

Starting from the 1st block unit of the second block, a type of each block unit, that is, whether the block unit is a control code, is determined backward level by level based on a first indicator and a third indicator configured in each block unit. Referring to FIG. 14A and FIG. 14B, the second block includes four block units, and a first indicator a being "1" configured in each block unit indicates that a block unit is a control code.

If the 1st block unit of the third block includes a first indicator a being "0" and a third indicator cc also being "0", it indicates that a next block unit of the block unit is a data code, and then it is determined that a data code starts from the 2nd block unit of the third block and a block unit before the 2nd block unit is a control code. In other words, a control code end position is distinguished.

In this embodiment, a boundary between a data code and a control code in the original 8B bitstream can be identified by using indicator information of each position in the T7 block, a boundary between a control code and a data code is identified through association by using an indicator defined in a compression process, and finally all bitstream information is identified, thereby reducing overheads of indication information in the original bitstream.

In addition, in this embodiment, a relatively common solution of transcoding 8B/10B into 100GE standard 64B/66B is used, and may be applied to transcoding of service streams of various frame structures. Therefore, complete code word transparency is ensured without loss of information in an original block stream, and transcoding is one-to-one, thereby implementing 100% transcoding efficiency without bandwidth expansion.

Optionally, in this embodiment, the method further includes: transcoding a block in the 66B bitstream into an S+D+T block structure, to support overheads such as a frequency deviation in a networking system and operation, administration and maintenance (Operations, Administration, and Maintenance, OAM).

Specifically, the method further includes the following step:

Step 6: Transcode a next block (a D block) of the first block (the T7 block) into an S0 block, and add a type field (type field) "0x78", where the type field is supplemented by deleting an S code from the original 8B/10B bitstream.

Further, step 6 may also have two possibilities:

In a possible case, a next block unit of the first block (the T7 block) is an S code in the original 8B/10B bitstream. According to a definition of low-rate Ethernet, for example, a GE service frame gap, the T7 block definitely includes at least one block unit that is a control code. It may be determined, by determining whether a next block unit of the type field (or block unit) "0x78" is "0x55", whether the block is a preamble of a data code or a compressed control code.

Specifically, if the next block unit is the type field "0x55", it indicates that the next block unit is a preamble of a data code, and a block in which the preamble is located is a data code. If no, it indicates that the next block unit is a compressed control code. In this determining method in this embodiment, content of compression and encoding of "0x5" is reserved, and remaining 4-bit space is used to determine whether to carry a byte "5", to form the type field "0x55", so that it can be determined whether a next block of the block unit "0x78" is a control code, and a conflict with a preamble of a block whose type field is "0x55" can be avoided.

Figure 15:
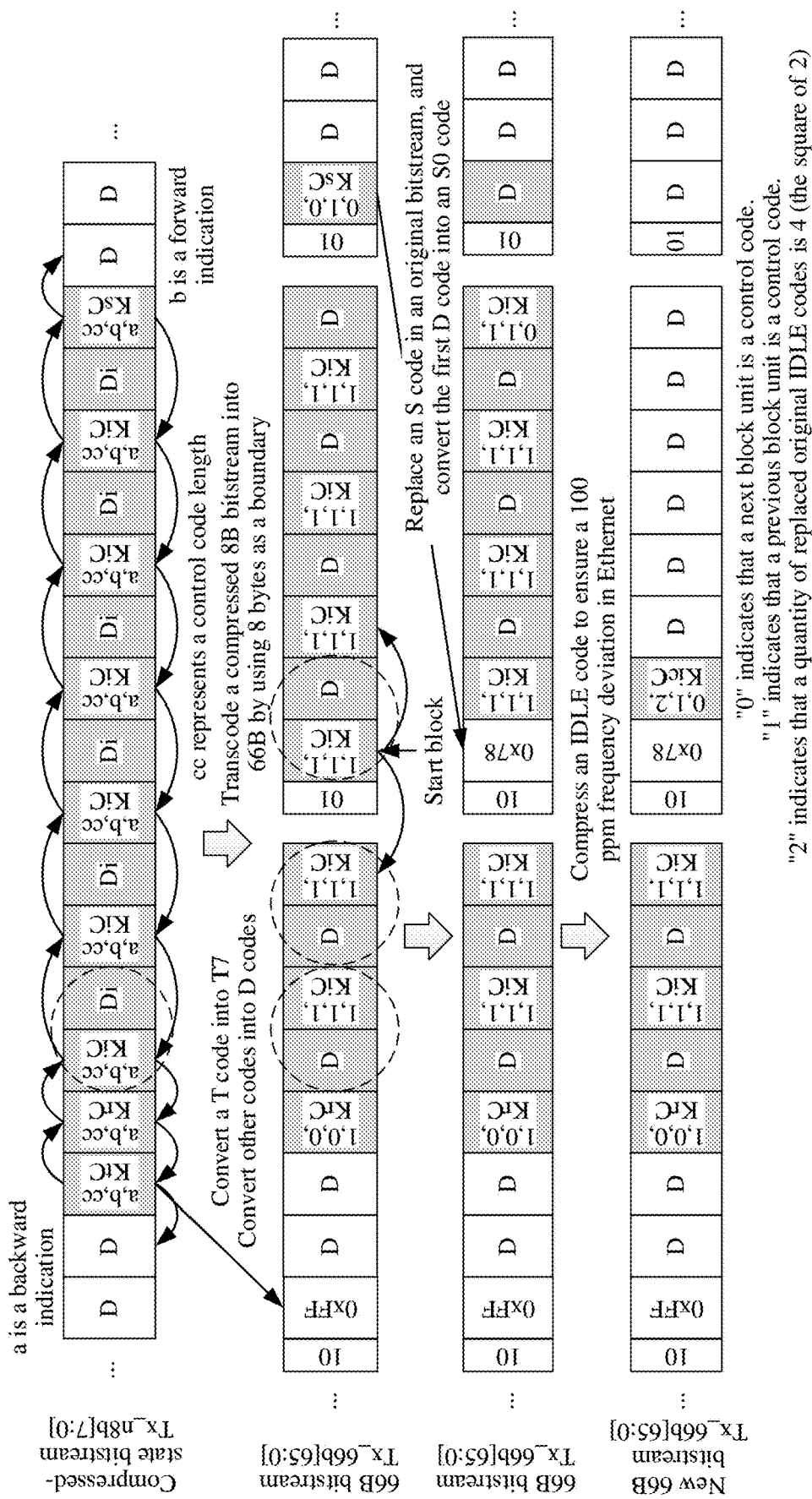
FIG. 15 is a schematic diagram of a processing procedure of conversion of a block structure of a 64B/66B bitstream according to an embodiment of this application.

In another possible case, if a next block unit of the first block (the T7 block) is not an S code in the original 8B/10B bitstream, or is a non-S code, the type field "0x78" may be directly inserted, and subsequently the S code (a block unit "0,1,0, KsC") in the original 10B bitstream is deleted. A processing manner is shown in FIG. 15.

Step 7: Compress and convert an IDLE block in the transcoded 64B/66B bitstream, to generate a new 64B/66B bitstream.

The foregoing transcoding process is complete transparent transcoding, that is, information carried in an original block keeps unchanged in a compression and transcoding process.

To support processing of a 100 ppm frequency deviation in an Ethernet asynchronous networking condition, in this embodiment, the IDLE code in the original 8B/10B bitstream may be compressed, that is, a new compression code type is defined, and is represented by "KicC", to indicate that the block unit includes at least two compression codes of the IDLE code. A fixed length of the block unit is 1 byte (8 bits). An indicator cc in the compression code is used to indicate that a quantity of replaced original IDLE codes is 4 (the square of 2).

As shown in FIG. 15, after each IDLE code (I code for short) is converted into a 66B bitstream, a block unit including a KiC code and one D code is formed, and a total of four block units are compressed into one 8-bit KicC code (block unit). All subsequent block units in the S0 block are filled with a data code "D code", and a finally generated new 66B bitstream structure is a "T7+S0+D" block structure.

Optionally, S0 is usually used as start data during synchronization in a process of mapping the new 66B bitstream structure to a frame structure. Therefore, the new 66B bitstream structure "T7+S0+D" may also be referred to as an "S0+D+T" block structure.

In this embodiment, according to the transcoding method in step 1 to step 5, the GE bitstream of the original 8B/10B bitstream may be transparently transcoded into a "T+D" structure of a 100GE standard 64B/66B bitstream. Further, in step 6 and step 7, a block structure of the transcoded 64B/66B bitstream is changed, and a control code "IDLE block" is compressed, so that an 8B/10B GE bitstream can be transparently transcoded into an "S+D+T" block structure of 100GE standard 64B/66B, to be applicable to some specific application scenarios.

Specifically, in step 6, bandwidth of a bitstream in the transcoding mechanism in this patent is further supplemented in step 6, and the IDLE block in the original bitstream is compressed, so that a transcoded bitstream is compressed to have narrower bandwidth than the original bitstream. In this way, overhead characteristics such as a 100 ppm frequency deviation in an asynchronous networking system and intra-bandwidth OAM can be supported in some specific scenarios.

Embodiment 2

This embodiment provides a method for transcoding an 8B/10B bitstream of a fibre channel (FC) service into a 64B/66B bitstream. As a typical access service of multi-service bearing, the FC service uses 8B/10B encoding at a physical layer for a low-rate interface, and encoding of a control code in the 8B/10B encoded bitstream is shown in Table 4.

TABLE 4

| Delimiter abbreviation Abbr. | Delimiter description Delimiter Function | Delimiter ordered set Ordered Set |
| --- | --- | --- |
| SOFc1 | SOF Connect Class 1 – Obsolete | K28.5 – D21.5 – D23.0 – D23.0 |
| SOFi1 | SOF Initiate Class 1 – Obsolete | K28.5 – D21.5 – D23.2 – D23.2 |
| SOFn1 | SOF Normal Class 1 – Obsolete | K28.5 – D21.5 – D23.1 – D23.1 |
| EOFt | EOF Terminate | K28.5 – D21.4 – D21.3 – D21.3 |
| EOFdt | EOF Disconnect – Terminate-Class 1- Obsolete | K28.5 – D21.4 – D21.4 – D21.4 |
| EOFa | EOF Abort | K28.5 – D21.4 – D21.7 – D21.7 |
| EOFn | EOF Normal | K28.5 – D21.4 – D21.6 – D21.6 |

Figure 16:
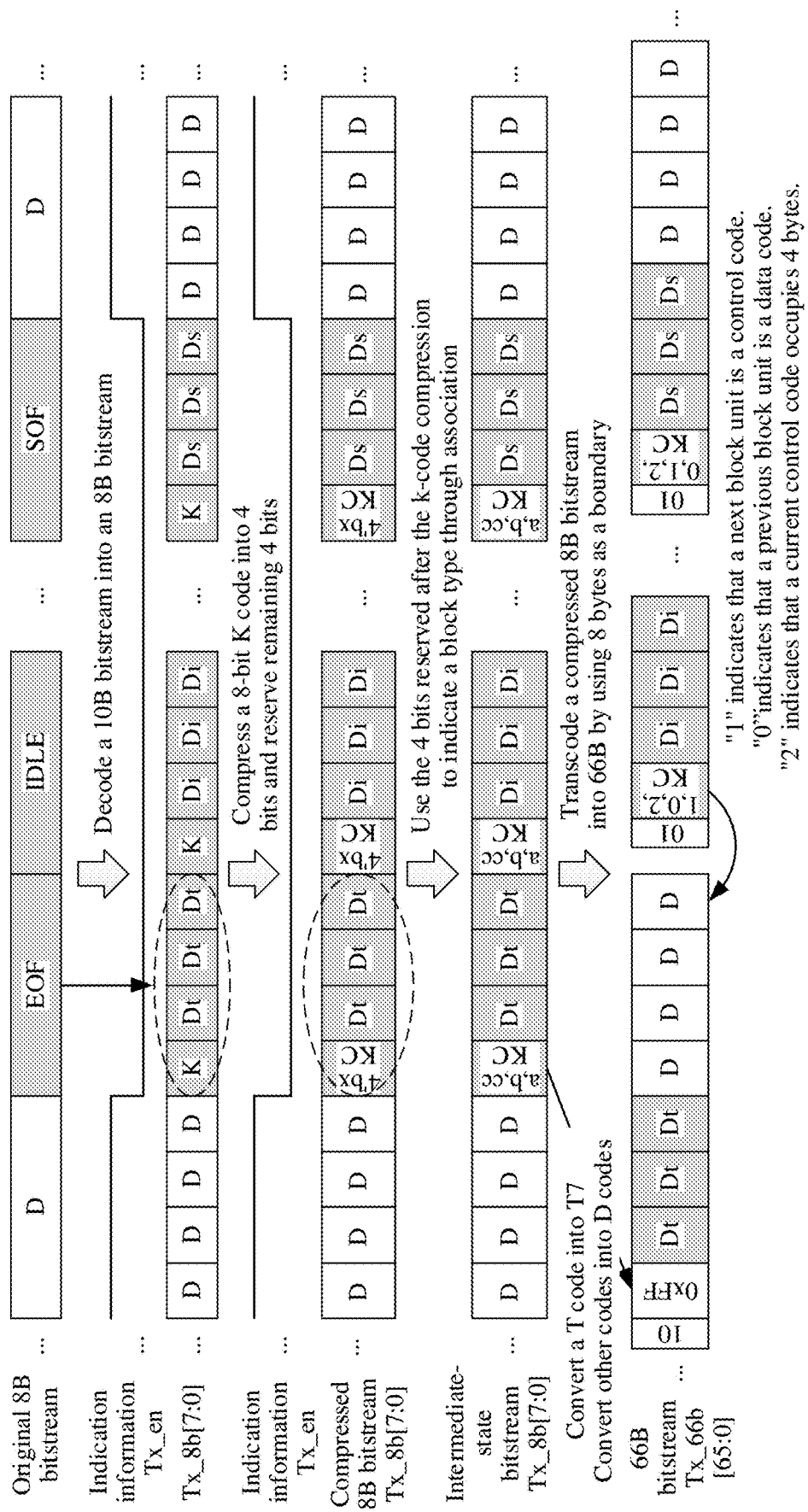
FIG. 16 is a schematic diagram of a processing procedure of transcoding an 8B bitstream of a fibre channel service into a 64B/66B bitstream according to an embodiment of this application.

Referring to FIG. 16, the 8B/10B bitstream of the FC service is in units of 4 bytes, where 1 byte=8 bits, namely, 4 bytes=32 bits. Both a control code and a data code are aligned based on 4 bytes. However, for the control code, only one K code K28.5 is used for an ordered set, and the other three blocks are all D codes, namely, a "K+D+D+D" structure.

For example, a control code "SOFC1" may include a "K28.5-D21.5-D23.0-D23.0" block, and "EOFt" may include a "K28.5-D21.4-D21.3-D21.3" block. Therefore, meanings of different blocks may be distinguished by using 3-byte data following the K code.

Based on a characteristic of the 8B/10B bitstream of the fibre channel service, as shown in FIG. 16, this embodiment provides a technical solution, and main steps of transparently transcoding the 8B/10B bitstream of the fibre channel service into 64B/66B are as follows:

Step 1: Obtain an 8B original bitstream, where the 8B original bitstream is in units of 4 bytes, namely, 32 bits, and the 8B original bitstream includes a data code D and control codes EOF, IDLE, SOF, and the like.

Step 2: Decode a 10B original bitstream into an 8B bitstream, and generate indication information Tx_en.

Optionally, the decoded 8B bitstream may be represented by "Tx_8[7:0]", and 1-bit indication information Tx_en is used to indicate which blocks in the decoded 8B bitstream are control codes and which blocks are data codes.

Figure 17:
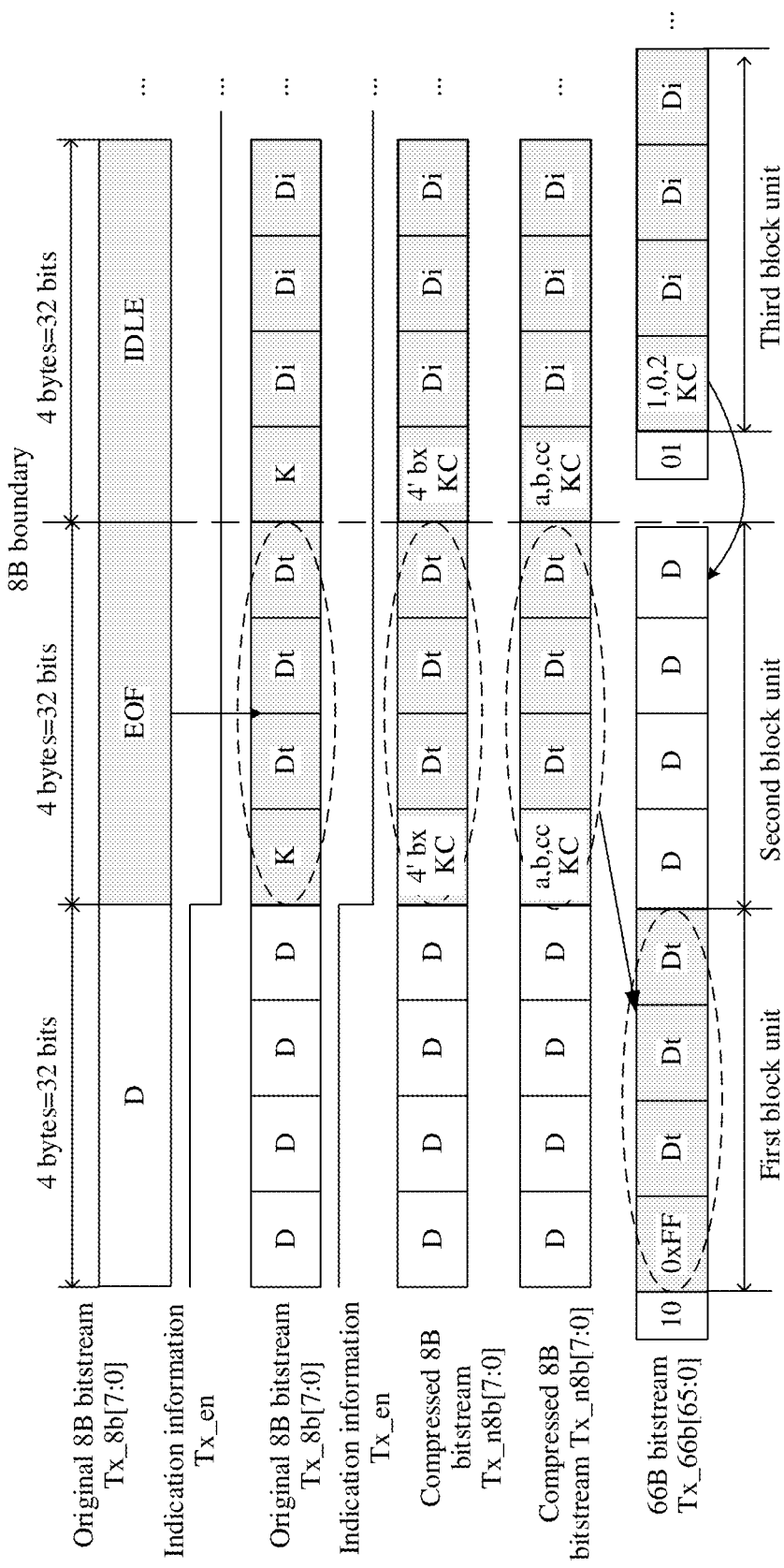
FIG. 17 is a schematic diagram of a partial processing procedure of transcoding an 8B bitstream of a fibre channel service into a 64B/66B bitstream according to an embodiment of this application.

Only K28.5 is used in the fibre channel service, and the control codes EOF, IDLE, and SOF each include 4 bytes. As shown in FIG. 16 and FIG. 17, the EOF code is represented by K+Dt+Dt+Dt after the decoding, and the IDLE code is represented by K+Di+Di+Di after the decoding. K, Dt, and Di are all 8-bit blocks.

Step 3: Compress the control code in the 8B original bitstream to generate a compressed bitstream "Tx_n8b[7:0]".

Based on a characteristic of a bitstream of the fibre channel service, each control code includes K code+D code×n (n=3). Because only K code K28.5 is used in the fibre channel service, a domain segment of the K code may be totally compressed theoretically, and all remaining 8-bit space is reserved for configuring at least one indicator.

In this embodiment, the K code is still compressed into 4 bits and is represented by KC based on a maximum of 12 types of K codes, and remaining 4-bit space 4'bx is reserved for configuring a subsequent indicator.

Step 4: Configure at least one indicator in remaining space after the compression, to replace the indication information to indicate a control code and a data code in the original 8B bitstream.

Specifically, a principle for configuring an indicator is as follows:

Three indicators are configured in the remaining 4-bit space, and are a first indicator a that occupies 1-bit space, a second indicator b that occupies 1-bit space, and a third indicator cc that occupies 2-bit space. The three indicators may be used to enable an indicator Tx_en in the 8B bitstream to be carried in bandwidth of the 8B bitstream.

Meanings of the three indicators are as follows:

The first indicator a is used to indicate whether a next block unit of a current block unit is a K code.

The second indicator b is used to indicate whether a previous block unit of the current block unit is a K code.

The third indicator cc is used to indicate a length of the current block unit or indicate a quantity of D codes in a block unit in which the third indicator is located.

Optionally, the quantity cc of D blocks may correspond to 0/1/3/7.

Further, for the first indicator a and the second indicator b, "1" indicates a control code, and "0" indicates a data code.

Optionally, because the 8B/10B bitstream of the fibre channel service is in units of 4 bytes, both a transmit end and a receive end know in advance that a structure of an ordered set of a control code is "K+D+D+D", that is, one K code is associated with three D codes. In this case, the receive end can also determine that a length of each block unit is 32 bits without a need to configure the third indicator cc.

Step 4: Use the remaining 4 bits reserved after the K-code compression to indicate a block unit type through association, and generate an intermediate-state bitstream Tx_8 b[7:0].

Indicator information of each K code is determined based on adjacent block units, and at least one indicator is configured in each K code. A specific process of configuring an indicator is the same as that in Embodiment 1. For details, refer to the descriptions of step 4 in Embodiment 1. Details are not described herein again.

Step 5: Generate a 64B bitstream with a predetermined structure based on the intermediate-state bitstream, that is, convert the intermediate-state bitstream Tx_8 b[7:0] into a 64B/66B bitstream Tx_66 b[65:0], where the 64B/66B bitstream Tx_66 b[65:0] includes at least two blocks, for example, a first block and a second block.

Specifically, eight 8-bit blocks are transcoded into one 64B block, and two blocks of predetermined structures are generated after the transcoding. For example, the generated first block is a T7 block, and the second block is a D block. In addition, a boundary between a data code and a control code in the 8B original bitstream is identified by using a second indicator in the T7 block, a boundary between a control code and a data code is identified through association by using the first indicator and the third indicator defined in step 3, and finally all bitstream information is identified.

The foregoing bitstream needs to meet the following conditions in a transcoding process:

Condition 1: A block including an EOF code in the original bitstream is transcoded and one block unit is generated. The block unit is a part of the T7 block, and is used to identify a boundary between a D code and a control code in the original bitstream.

In a process of converting the compressed 8B bitstream Tx_n8b[7:0] into the 66B bitstream Tx_66 b[65:0], the original control code "EOF code" is transcoded into a first block unit, and a KC code in the first block unit is used to replace a type field in the T7 block, and therefore the EOF code does not participate in association and configuration of an indicator. In addition, the first block unit is configured at a front position of the T7 block in a K+D+D+D structure, and 4x8 bits of the original data code "D code" are configured after the first block unit. A subsequent control code is associated and configured in the manner in step 4, and an indicator in a next block unit of the T7 block is used to determine a boundary between a data code and a control code in the original bitstream.

As shown in FIG. 17, a second indicator b is set to 0 in a control code KC in a third block unit, to indicate that a previous block unit (a second block unit) of the current third block unit is a data code. In this case, it is determined that a boundary between a data code and a control code in the transcoded 66B bitstream is a boundary between the second block unit and the third block unit.

Condition 2: Blocks other than the block including the EOF code are transcoded into D blocks, control codes are all compressed in the foregoing manner, and an indicator is configured to indicate whether adjacent previous and next block units are control codes.

As shown in FIG. 17, when being transcoded into the T7 block in the 66B bitstream, a control code "a,b,cc, KC" of the first block unit in the compressed 8B bitstream is replaced with a type field "0xFF" in T7, and "0xFF" is associated with three D codes to form a 4-byte block unit. Then, data codes in the original 8B bitstream are sequentially moved backward to form the second block unit.

In the second block, indicators "1,0,2" are configured in the KC code of the third block unit. A first indicator "1" indicates that a next block unit is a control code, a second indicator "0" indicates that a previous block unit (the second block unit) is a data code, and a third indicator "2" indicates that a current control code occupies 4 (22) bytes, namely, 32 bits.

In this embodiment, transcoding and indicator configuration are performed on the control codes EOF, IDLE, and SOF in the FC service, and the control code is transcoded into a structure of a T7 block and a D block, so that the original 8B bitstream is transcoded into a 100GE standard 64B/66B bitstream of a T+D structure.

This embodiment provides a common method for transparently transcoding 8B/10B into 64B/66B. An original 8B/10B bitstream is first transcoded into a 10B bitstream, thereby reducing 20% fixed overheads. Then, a control code in an 8B bitstream of a fibre channel service is compressed, so that remaining space is saved for configuring at least one indicator. These indicators are used for association between blocks. Finally, a compressed bitstream is mapped to a 64B bitstream of a predetermined structure, the 64B bitstream of the predetermined structure includes a special T7 block, and starting from the T7 block, adjacent identification is performed by using a remaining indicator after the control code is compressed, to finally accurately identify information about the entire bitstream and determine a boundary of the control code. In this way, 8B/10B loss and re-recovery are avoided.

It should be noted that, according to the method for compressing an 8B/10B bitstream provided in this embodiment, this compression and transcoding manner is not only applicable to the K code, but also can be used to perform similar processing on a block of another type.

In addition, the method may be further applied to transcoding of service streams of various frame structures. Therefore, complete code word transparency is ensured without loss of information in an original block stream, and transcoding is one-to-one, thereby implementing 1:1 transcoding efficiency without bandwidth expansion.

The method provided in this embodiment is applied to a typical access service such as a fibre channel service other than a GE service. Based on the foregoing common rules of decoding and transcoding, a 8B/10B bitstream of the fbire channel service is transcoded into a standard 100GE 64B/66B bitstream, to meet various service requirements.

In addition, for the foregoing embodiments, in a process of compressing the 8B original bitstream, block length information in indication information after the compression may be used as a part of content of compression and encoding, that is, blocks of different lengths are separately encoded, thereby increasing a quantity of blocks that can be supported. In addition, encoding is performed based on required specific information, and indicators of a block after the compression are not limited to the first indicator, the second indicator, and the third indicator in this embodiment of this application, which occupy 4 bits in total. More or fewer bits may be defined as required. The remaining indicator after the control code is compressed is not limited to a specific data structure described in this patent, and another data structure that can constitute a relationship between adjacent blocks is included.

In a process of configuration and transcoding into a 64B bitstream based on a form of the compressed bitstream, a mechanism in which each configured indicator is used for an indication and adjacent blocks are associated level by level, to determine a boundary between a control code and a data code. A start identification point after the control code is compressed may be but is not limited to the T7 block and an S block mentioned in this embodiment of this application, and may further include another block such as an S block.

The association indication may be but is not limited to a forward indication and a backward indication mentioned in this embodiment of this application, or may be one of the two indications, or the two indications are multiplexed onto 1 bit, and a block type S or T is used for distinguishing.

The predetermined structure of the transcoded 64B bitstream includes but is not limited to various structures such as an S+D block, a D+T block, an O+D block, and an S+D+T block. In this embodiment of this application, only the foregoing several common block structures are described, and another block structure is not limited in this embodiment of this application.

Embodiment 3

This embodiment provides a method for transcoding a 10GE 64B/66B bitstream into a 100GE standard 64B/66B bitstream.

FIG. 18a and FIG. 18b are respectively a schematic diagram of 10GBASE-R 64B/66B encoding and a schematic diagram of 100GBASE-R 64B/66B encoding. In FIG. 18a, as a typical access service of multi-service bearing, 10GBASE-R 64B/66B encoding is not totally the same as 100GBASE-R 64B/66B encoding. Therefore, transparent transcoding is required before L1.5 switching.

Input data includes a bit position, a data block format, and a control block format. Further, the data block format includes D0D1D2D3/D4D5D6D7, and the control block format may include a mixture of a C code, an O code, a D code, an S code, and a data code "D code".

Referring to FIG. 18a, for all control block formats of 10BASE-R 64B/66B encoding, in a process of conversion into a 100GBASE-R 64B/66B encoded bitstream shown in FIG. 18b, all block units except block units T0 to T7 in seven control block formats of original 10GE are encoded to generate one block unit. A length of the block unit is 64 bits, namely, 8 bytes.

Optionally, the following eight 64B/66B blocks in different block payloads may be transcoded based on eight different control block formats: T0 to T7. For example, as shown in FIG. 18a, type fields of the eight different types of control blocks are:

0x87, 0x99, 0xaa, 0xb4, 0xcc, 0xd2, 0xe1, and 0xff.

Figure 18C:
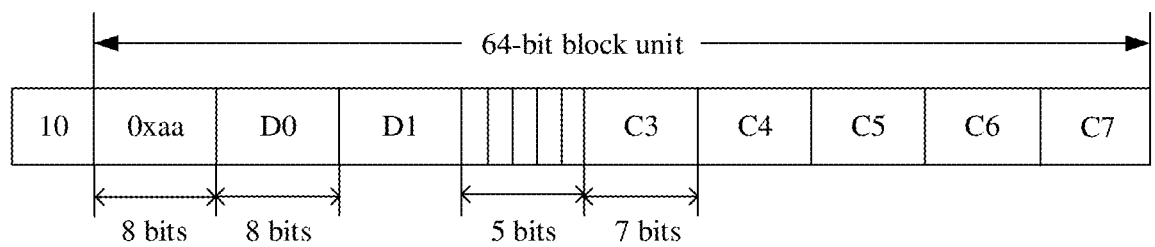
FIG. 18c is a schematic structural diagram of a 64-bit block unit of a 10GE service according to an embodiment of this application.

In this embodiment, for example, a format of a control block is "D0D1T2C3/C4C5C6C7". A control code type field corresponding to the block format is "0xaa". As shown in FIG. 18c, the block unit includes data codes D0 and D1 and control codes C3 to C7. Each D code is 8 bits, and each C code is 7 bits, or in other words, each C code is shorter than the D code by 1 bit. There are a total of five control codes: C3 to C7, and therefore the control codes are shorter than the D code by 5 bits. In this case, remaining 5-bit space is reserved to finally ensure that the block includes one block unit with a length of 64 bits.

The following uses the block whose type field is "0xaa" as an example to describe in detail conversion of 64B/66B encoding of a 10GE service.

Figure 19:
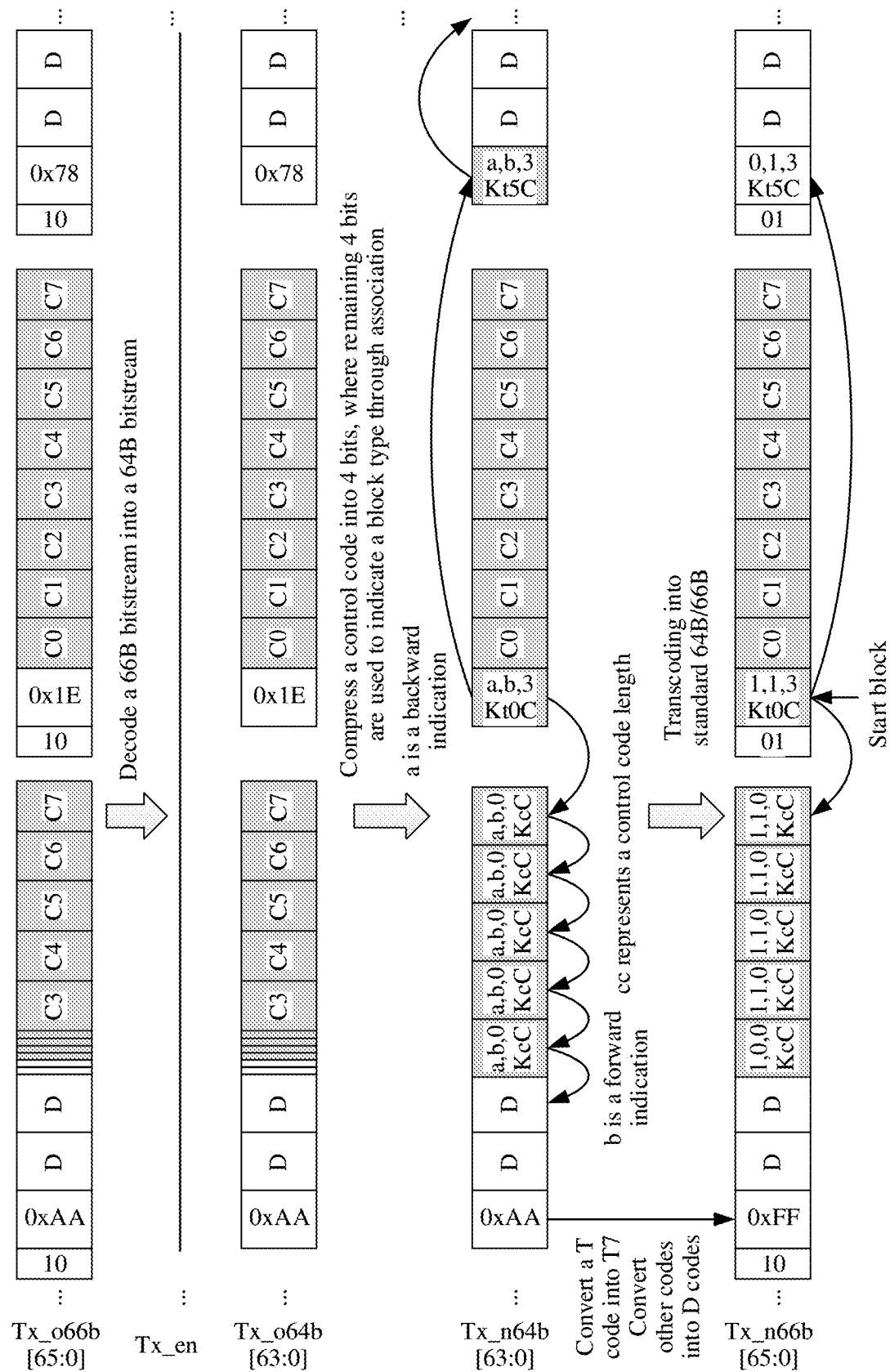
FIG. 19 is a schematic diagram of a processing procedure of transcoding a 10GBASE-R 64B/66B bitstream into a 100GBASE-R 64B/66B bitstream according to an embodiment of this application.

As shown in FIG. 19, specifically, a transcoding processing process provided in this embodiment is as follows:

Step 1: Obtain an original 66B bitstream.

Optionally, the original 66B bitstream includes a 66B block whose type field is "0xaa", and the 66B block includes data codes D0 and D1 and control codes C3 to C7.

Step 2: Decode the original 66B bitstream into a 64B bitstream, and use a 1-bit signal Tx_en to indicate statuses of a control code and a data code in the decoded 64B bitstream.

Step 3: Compress all control blocks except a block unit at a position T2 in the 64B bitstream based on a control block format of the decoded 64B bitstream, to generate a plurality of block units. Each block unit includes 4-bit "KcC" and 4-bit remaining space, the 4-bit remaining space is used to carry indicators "a,b,cc", and the indicators are used to indicate a type of an adjacent block or block unit through association. Further, the indicator a is used to indicate whether a next block unit is a control code, the indicator b is used to indicate whether a previous block unit of a current block unit is a control code, and the indicator cc is used to indicate a length of the current block unit.

Optionally, in this embodiment, a length of each block unit is 1 byte (namely, 8 bits).

In step 3, the indicators "a,b,cc" are configured in the remaining space after the compression to indicate a status of a control code of an adjacent block, and a boundary between a control code and a data code is further determined. Therefore, an indication of the original indication information Tx_en is eliminated, thereby reducing overheads.

Optionally, in a compression process, control codes whose type fields are 0x1e, 0x2d, 0x33, 0x66, 0x55, 0x78, and 0x4b in the original 64B/66B bitstream may be represented by Kt0, Kt1, Kt2, Kt3, Kt4, Kt5, and Kt6. For example, as shown in FIG. 19, the type field "0x1e" in the original 66B bitstream changes into "Kt0C" after the compression.

Specifically, for a case in which a boundary between a control code and a data code in an original bitstream is determined by using indicators "a,b,cc", refer to the foregoing embodiment. Details are not described in this embodiment again.

Step 4: Convert an intermediate-state bitstream Tx_n64b [63:0] obtained after the compression and configured with an indicator into a 100GE standard 64B/66B bitstream.

The converted 100GE standard 64B/66B bitstream includes a first block and a second block.

Optionally, the first block is a T7 block, and the second block is a D block. A type field "0xaa" in the intermediate-state block is replaced with a type field "0xFF" of the T7 block, to form a standard code pattern structure of "T7 block+D block". Other blocks are transcoded into D blocks.

The D blocks include a control code "1,1,3 Kt0C" that is a start block of the D blocks. A first indicator "1" indicates that a next block unit (a third block) is a control code, a second indicator "1" indicates that a previous block unit (the last block unit of the first block) is a control code, and a third indicator "3" indicates that a length of a current block unit is a length of 8 (the 3rd power of 2) C codes, that is, 56 bits, and each C code is 7 bits.

In this method, an original 10GBASE-R 64B/66B bitstream is transparently transcoded into a 100GE standard 64B/66B encoded bitstream by using the foregoing mechanism, and each block before and after the transcoding is a block in units of 8 bytes.

In this method, complete transparent transcoding of a block is implemented, and information in an original block stream is not lost in a transcoded bitstream. Transcoding is one-to-one, thereby implementing 100% transcoding efficiency without bandwidth expansion.

It may be understood that in this application, the foregoing method may be further used to transcode another original bitstream with a similar structure to form a 100GE standard 64B/66B bitstream. In addition, transcoding of a bitstream of another type may be further implemented based on the series of steps such as compression, indicator configuration, and transcoding. This is not limited in this embodiment of this application.

It should be noted that in this embodiment, transcoding is performed by using only a 64-bit block whose type field is "0xaa" as an example. For other blocks shown in FIG. 18a, for example, blocks whose type fields are 0x99, 0x4b, and 0xcc, the transcoding method in this embodiment may also be used to generate a 100GE standard 64B/66B encoded bitstream. Transcoding processes of these blocks are not described in this embodiment.

Figure 20:
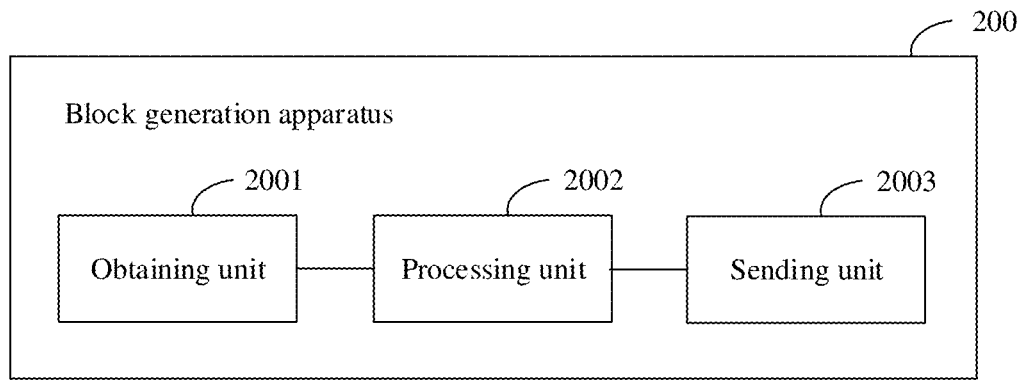
FIG. 20 is a schematic structural diagram of a block generation apparatus according to an embodiment of this application.

FIG. 20 is a schematic structural diagram of a block generation apparatus according to an embodiment of this application. The apparatus may be an adaptation unit in any one of the foregoing embodiments, for example, a uAdpt, and is configured to implement steps of the method in each of the foregoing embodiments.

As shown in FIG. 20, the apparatus 200 may include an obtaining unit 2001, a processing unit 2002, and a sending unit 2003. In addition, the apparatus 200 may further include more or fewer components, for example, a storage unit. This is not limited in this embodiment.

Further, the processing unit 2002 is configured to generate a first block and a second block, where the first block includes a first block unit, the second block includes a second block unit, a first indicator is configured in the first block unit, and the first indicator is used to indicate whether the second block unit is a control code. The sending unit 2003 is configured to send the first block and the second block.

Optionally, in a specific implementation of this embodiment, the first block further includes a third block unit, and the third block unit is before the first block unit; and a second indicator is further configured in the first block unit, and the second indicator is used to indicate whether the third block unit before the first block unit is a control code.

Optionally, in another specific implementation of this embodiment, the control code includes one K code, or includes one K code and at least one D code; and if the first block unit is a control code, a third indicator is further configured in the first block unit, and the third indicator is used to indicate a quantity of D codes in the first block unit.

Optionally, in still another specific implementation of this embodiment, the second block further includes a fourth block unit, and the fourth block unit is after the second block unit.

At least one indicator is configured in the second block unit, and the at least one indicator is used to indicate whether the fourth block unit is a control code and indicate whether the first block unit is a control code; and if the second block unit is a control code, the at least one indicator is further used to indicate a quantity of D codes in the second block unit.

Optionally, in still another specific implementation of this embodiment, the obtaining unit 2001 is configured to obtain a first bitstream, where the first bitstream includes a control code. The processing unit 2002 is specifically configured to: compress the control code in the first bitstream, configure a first indicator in remaining block space after the compression, and generate the first block and the second block.

The first bitstream may be an 8B encoded bitstream (transcoded from a 10B bitstream into the 8B bitstream), or may be a 10GE 64B/66B encoded bitstream.

Optionally, in still another specific implementation of this embodiment, the control code in the first bitstream includes at least one 8-bit block unit; and the processing unit 2002 is specifically configured to: compress one 8-bit block unit in the first bitstream to obtain N-bit remaining space, where N≤8; configure the first indicator in the N-bit remaining space, and fill the N-bit remaining space with one 8-bit K code; and generate the first block and the second block based on the 8-bit K code.

For example, if N=4, a first indicator, a second indicator, and a third indicator may be configured in remaining 4 bits.

Further, the first indicator a occupies 1 bit, the second indicator b occupies 1 bit, and the third indicator cc occupies 2 bits.

If the first indicator a and the second indicator b are "1", it indicates that an indicated block unit is a control code. If the first indicator a and the second indicator b are "0", it indicates that the indicated block unit is a data code.

In addition, the third indicator cc may be configured or may not be configured in a block unit. However, a receive end and a transmit end need to agree in advance, and both ends know a length of the block unit. For example, both a control code and a data code of a fibre channel service are encoded in units of 4 bytes. In this case, each control code "K code" is associated with three D codes, namely, a "K+D+D+D" structure. Therefore, only the first indicator and the second indicator need to be configured to indicate whether a next block and a previous block are control codes, thereby improving identification efficiency, and reducing 2-bit overheads, which may be used to carry other information.

Optionally, in still another specific implementation of this embodiment, the first block is a T7 block, and the second block is a D block; or the first block is an S0 block, and the second block is a D block; or the first block is an O block, and the second block is a D block; or the first block is an IDLE block, and the second block is a D block.

The T7 block, the S0 block, the O block, and the IDLE block are control codes, and the D block is a data code.

In addition, the first block may be alternatively a D block, and the second block is any one of the T7 block, the S0 block, the O block, and the IDLE block.

Optionally, the first block is a D code, and the second block is any one of the T7 block, the S0 block, the O block, and the IDLE block.

Optionally, a third block is further included, the third block is a D block, the second block is an S0 block, and the first block is a T7 block. In this case, a block structure of a transcoded 64B/66B bitstream is "S0+D+T".

In addition, an entire bitstream may be alternatively transcoded into a 64B/66B bitstream of another structure. This is not limited in this embodiment.

Optionally, in still another specific implementation of this embodiment, the processing unit 2002 is further configured to: if the first block is a T7 block and the second block is a D block, transcode the D code into an S0 block, where the S0 block includes a type field, a block unit including a K code, and at least one block unit including a D code, where the block unit including the K code is a block unit generated after each block unit that is of the original D block and that includes one K code and at least one D code is compressed, and the block unit of the K code includes at least one indicator, for example, including three indicators: a, b, and cc.

The type field of the S0 block is "0x78".

In addition, in this embodiment, the D block may be transcoded into a block of another type, for example, an O block or an IDLE block.

Optionally, in still another specific implementation of this embodiment, the first block is a T7 block, and the second block is an S0 block; and the processing unit 2002 is further configured to generate a third block, where the third block is a D block.

It may be understood that the processing unit 2002 may further generate more blocks such as a fourth block and a fifth block based on a characteristic of an original bitstream. A specific generation process is the same as that in the foregoing embodiment of the method, and details are not described again in this embodiment.

Figure 21:
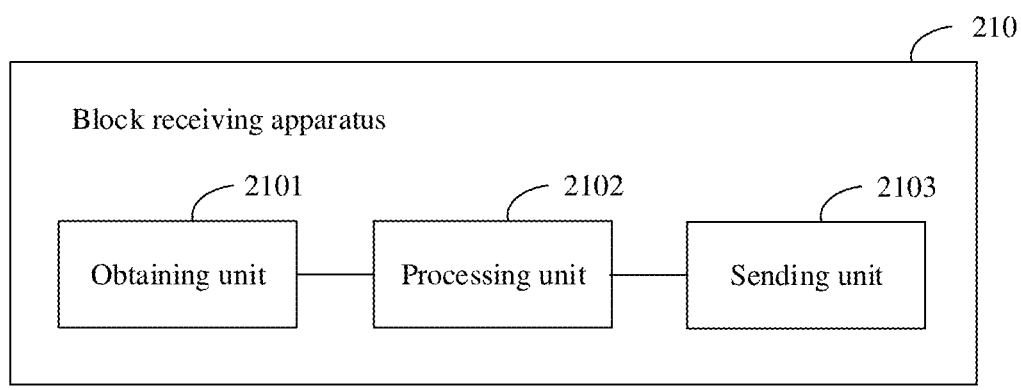
FIG. 21 is a schematic structural diagram of a block receiving apparatus according to an embodiment of this application.

In still another embodiment of this application, a block receiving apparatus is further provided. As shown in FIG. 21, the apparatus 210 includes an obtaining unit 2101, a processing unit 2102, and a sending unit 2103. In addition, the apparatus 210 may further include more or fewer components, for example, a storage unit. This is not limited in this application.

The obtaining unit 2101 is configured to receive a first block and a second block, where the first block includes a first block unit, the second block includes a second block unit, and a first indicator is configured in the first block unit.

The processing unit 2102 is configured to determine, based on an indication of the first indicator, whether the second block unit is a control code.

Optionally, in a specific implementation of this embodiment, the first block further includes a third block unit, the third block unit is before the first block unit, and a second indicator is further configured in the first block unit; and the processing unit 2102 is further configured to determine, based on an indication of the second indicator, whether the third block unit before the first block unit is a control code.

Optionally, in another specific implementation of this embodiment, the control code includes one K code, or includes one K code and at least one D code; and the processing unit 2102 is further configured to: if it is determined that the first block unit is a control code, determine a quantity of D codes in the first block unit based on a third indicator in the first block unit.

Optionally, in still another specific implementation of this embodiment, the second block further includes a fourth block unit, the fourth block unit is after the second block unit, and at least one indicator is configured in the second block unit; and the processing unit 2102 is further configured to determine, based on the at least one indicator in the second block unit, whether the fourth block unit is a control code and whether the first block unit is a control code.

Optionally, in still another specific implementation of this embodiment, the processing unit 2102 is specifically configured to: if the first indication information indicates that the second block unit is not a control code, determine that a data code starts from the second block unit.

It should be noted that the block receiving apparatus provided in this embodiment may be the block generation apparatus in the foregoing embodiment, or an adaptation unit in the foregoing embodiment, for example, a uAdpt or an nAdpt, and is configured to implement the block receiving method corresponding to the foregoing embodiment, and identify a boundary between a control code and a data code in an original bitstream by using the method.

In this embodiment, at least one indicator is configured in a block unit to indicate whether a previous block unit and a next block unit of a current block unit are control codes and indicate a D code length of the control code, so that a boundary between a control code and a data code is determined based on a level-by-level indication of an indicator in each block unit, thereby avoiding overheads of extra information.

Figure 22:
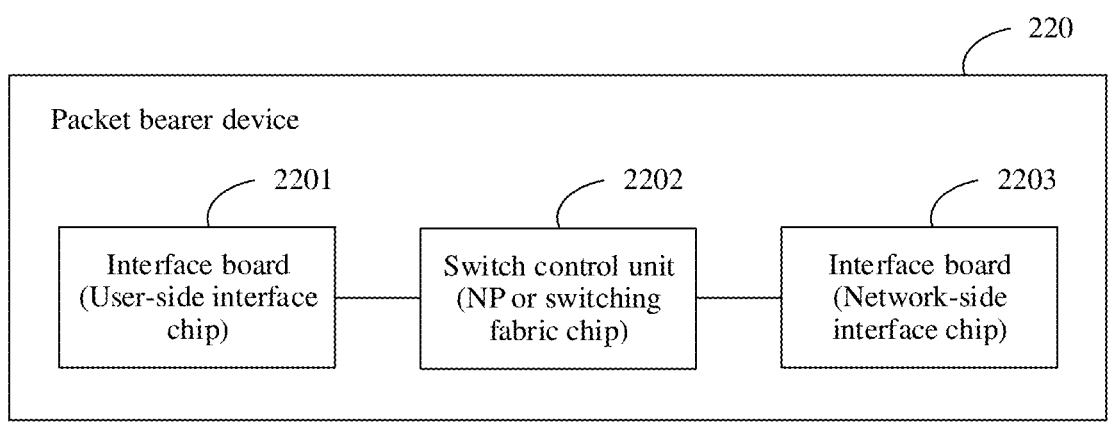
FIG. 22 is a schematic structural diagram of a packet bearer device according to an embodiment of this application.

In a specific hardware embodiment, as shown in FIG. 22, a packet bearer device 220 is further provided. The device may be an IP mobile bearer network (Radio Access Network, RAN) device or a packet transport network (PTN) device that is planned to load an X-E characteristic, and is configured to implement various functions of the PE or the P in the foregoing embodiment.

Specifically, referring to FIG. 22, the packet bearer device 220 includes an interface board 2201, an interface board 2203, and a switch control unit 2202. The interface board 2201 is connected to an input end of the switch control unit 2202, and the interface board 2203 is connected to an output end of the switch control unit 2202.

Further, the interface board 2201 includes a user-side interface chip, configured to implement various functions of a uAdpt of the PE. The switch control unit 2202 includes a network processor (NP) or a switching fabric chip, configured to implement a function of a switching unit of the PE. The interface board 2203 includes a network-side interface chip, configured to implement various functions of an nAdpt of the PE.

In addition, the interface board 2201 and the interface board 2203 may further carry another functional unit, for example, a multi-service functional unit.

Figure 23:
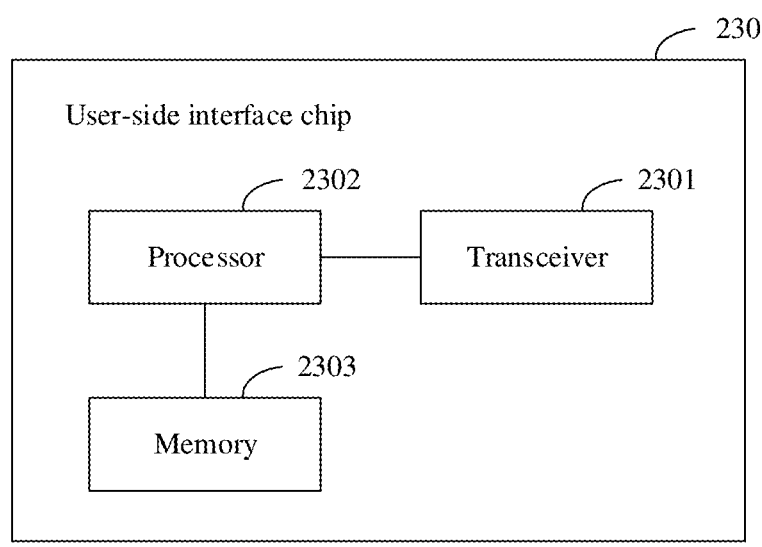
FIG. 23 is a schematic structural diagram of a user-side processing chip according to an embodiment of this application.

Further, as shown in FIG. 23, a user-side processing chip of the interface board 2201 may further include a transceiver 2301, a processor 2302, and a memory 2303. In addition, the user-side processing chip may further include more or fewer components, or combine some components, or have different component arrangements. This is not limited in this application.

The processor 2302 is a control center of the user-side processing chip, and executes various functions of the user-side processing chip by running or executing a software program and/or a unit or module stored in the memory 2303 and invoking data stored in the memory.

The processor 2302 may include an integrated circuit (IC), for example, may include a single packaged IC, or may include a plurality of connected packaged ICs with a same function or different functions. For example, the processor may include only a CPU, or may be a combination of a GPU, a digital signal processor (DSP), and a control chip in a transceiver module.

The transceiver 2301 may include components such as a receiver, a transmitter, and an antenna, and is configured to: receive an original bitstream, and send a transcoded bitstream, where the transcoded bitstream includes a first block, a second block, and the like. In addition, the transceiver 2301 is further configured to implement communication and transmission between a user side and a network device.

Specifically, the transceiver 2301 may include a communications module such as a wireless local area network module, a Bluetooth module, or a baseband module, and a radio frequency (RF) circuit corresponding to the communications module, and is configured to perform wireless local area network communication, Bluetooth communication, infrared communication, and/or cellular communication system communication. In addition, the transceiver 2301 may further support direct memory access.

In different implementations of this application, transceiver modules in the transceiver 2301 are usually presented in a form of an integrated circuit chip, and may be selectively combined without a need to include all the transceiver modules and corresponding antenna groups. For example, the transceiver may include only a baseband chip, a radio frequency chip, and a corresponding antenna, to provide a communication function in a cellular communications system through a wireless communication connection established by the transceiver module, such as wireless local network access or WCDMA access.

The memory 2303 is configured to store application program code for executing the technical solutions of this application, and the processor 2302 controls the execution. Specifically, the processor 2302 is configured to execute the application program code stored in the memory, to implement the block generation method and the block receiving method in the foregoing embodiments.

Further, the memory 2303 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, or the like), a magnetic disk storage medium, or another magnetic storage device, or any other medium that can be used to carry or store expected program code in a form of an instruction or a data structure and that can be accessed by a computer. This application is not limited thereto. The memory may independently exist, or may be integrated into the processor.

For example, in the embodiment of the block generation apparatus shown in FIG. 20 in this application, functions to be implemented by the obtaining unit 2001 and the sending unit 2003 may be implemented by the transceiver 2301 of the user-side processing chip, or may be implemented by the processor 2302 by controlling the transceiver 2301. A function to be implemented by the processing unit 2002 may be implemented by the processor 2302.

For example, in the embodiment of the block receiving apparatus shown in FIG. 21 in this application, functions to be implemented by the receiving unit 2101 and the sending unit 2103 may be implemented by the transceiver 2301 of the user-side processing chip, or may be implemented by the processor 2302 by controlling the transceiver 2301. A function to be implemented by the processing unit 2102 may be implemented by the processor 2302.

In addition, a user-side processing chip 230 shown in FIG. 23 in this application may be disposed on or integrated into the user-side adaptation unit (uAdpt) shown in FIG. 1a, to implement all functions of the uAdpt.

Further, the memory 2303 is configured to store a computer program product, and the computer program product includes one or more computer instructions, such as a synchronization carrier frequency signal sending instruction. When the computer program instructions are loaded and executed on the computer, the procedure or functions according to the foregoing embodiments of this application are all or partially generated.

The computer instructions may be stored in a computer-readable storage medium or may be transmitted from a computer-readable storage medium to another computer-readable storage medium. For example, the computer instructions may be transmitted from a website, computer, server, or data center to another site, computer, or server in a wired or wireless manner. The computer readable storage medium may be a magnetic disk, a compact disc, a read-only memory ROM, or a random access memory RAM.

An embodiment of this application further provides a system. As shown in FIG. 2, the system may be an Ethernet network, a FlexE network, or X-E networking. Specifically, the network system includes user equipment UE and a network device PE or P, and the PE is configured to perform the block generation method and the block receiving method in the foregoing embodiments. For example, a PE1 transcodes an original bitstream into a 100GE standard 64B/66B encoded bitstream, and sends the transcoded standard bitstream to the P. The P transmits the received standard bitstream to a PE2, and after receiving the standard 64B/66B encoded bitstream, the PE2 transcodes the standard 64B/66B encoded bitstream into an original 8B/10B bitstream and outputs the 8B/10B bitstream to the user equipment.

This embodiment provides an apparatus and a system. A transmitted bitstream includes a first block and a second block, and at least one indicator is configured in a block unit in the first block to indicate statuses of a control code and a data code of an adjacent block, so that a boundary between a control code and a data code can be determined based on content of a transcoded block, thereby reducing overheads of indication information.

A person skilled in the art may clearly understand that, the technologies in the embodiments of the present invention may be implemented by software in addition to a necessary general hardware platform. Based on such an understanding, the technical solutions in the embodiments of the present invention essentially, or the part contributing to the prior art may be implemented in the form of a software product. The computer software product is stored in a storage medium, such as an ROM/RAM, a magnetic disk, or an optical disc, and includes several instructions for instructing a computer device (which may be a personal computer, a server, or a network device) to perform the methods described in the embodiments or some parts of the embodiments of the present invention.

For same or similar parts in the embodiments in this specification, mutual reference may be made between these embodiments. Especially, the embodiments of the block generation apparatus, the block receiving apparatus, the packet bearer device, and the system are basically similar to a method embodiment, and therefore are described briefly. For related parts, reference may be made to partial descriptions in the method embodiment.

In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not mean being definitely different either.

The foregoing descriptions are implementations of this application, but are not intended to limit the protection scope of this application.

What is claimed is:

1. A block generation method, wherein the method comprises:
generating a first block and a second block, wherein the first block comprises a first block unit, the second block comprises a second block unit, a first indicator is configured in the first block unit, and the first indicator is used to indicate whether the second block unit is a control code; and
sending the first block and the second block;
wherein the first block further comprises a third block unit, and the third block unit is before the first block unit; and
a second indicator is further configured in the first block unit, and the second indicator is used to indicate whether the third block unit before the first block unit is a control code.

2. The method according to claim 1, wherein
if the first block unit is a control code, another indicator is further configured in the first block unit, and the another indicator is used to indicate a quantity of D codes in the first block unit;
at least one of the control code forming the first block unit or the control code forming the second block unit comprises one K code, or comprises one K code and at least one D code, and
the K code is a control code and each of the D codes is a data code.

3. The method according to claim 1, wherein the second block further comprises another block unit, and the another block unit is after the second block unit;
- at least one indicator is configured in the second block unit, and the at least one indicator is used to indicate whether the another block unit is a control code and indicate whether the first block unit is a control code;
- if the second block unit is the control code, the at least one indicator is further used to indicate a quantity of D codes in the second block unit; and
- each of the D codes is a data code.

4. The method according to claim 1, wherein
- the first block is a T7 block, and the second block is a D block; or
- the first block is an S0 block, and the second block is the D block; or
- the first block is an O block, and the second block is the D block; or
- the first block is an IDLE block, and the second block is the D block, wherein
- the T7 block, the S0 block, the O block, and the IDLE block are different types of control codes, and the D block is a data code.

5. The method according to claim 1, wherein if the first block is a T7 block and the second block is a D block, the method further comprises:
- transcoding the D block into an S0 block, wherein the S0 block comprises a type field, a block unit of a K code, and at least one block unit comprising a D code, wherein
- the block unit comprising the K code is a block unit generated after each block unit that is of the original D block and that comprises one K code and at least one D code is compressed, and the block unit of the K code comprises at least one indicator,
- the K code is a control code, the D block is a data code, the T7 block and the S0 block are different types of control codes, and the D code is a data code.

6. The method according to claim 1, wherein:
- the first block is a T7 block, and the second block is an S0 block;
- the method further comprises: generating a third block, wherein the third block is a D block; and
- the T7 block and the S0 block are different types of control codes, and the D block is a data code.

7. A block generation method, wherein the method comprises:
- generating a first block and a second block, wherein the first block comprises a first block unit, the second block comprises a second block unit, a first indicator is configured in the first block unit, and the first indicator is used to indicate whether the second block unit is a control code;
- sending the first block and the second, wherein
- the generating of the first block and the second block comprises:
- obtaining a first bitstream, wherein the first bitstream comprises a first control code; and
- compressing the first control code in the first bitstream, configuring the first indicator in remaining block space after the compression, and generating the first block and the second block.

8. The method according to claim 7, wherein the first control code in the first bitstream comprises at least one 8-bit block unit; and
- the compressing the first control code in the first bitstream, configuring the first indicator in remaining block space after the compression, and generating the first block and the second block comprises:
- compressing one 8-bit block unit in the first bitstream to obtain N-bit remaining space, wherein N≤8;
- configuring the first indicator in the N-bit remaining space, and filling the N-bit remaining space with one 8-bit K code;
- generating the first block and the second block based on the 8-bit K code: and
- the 8-bit K code is a control code.

9. A block receiving method, wherein the method comprises:
- receiving a first block and a second block, wherein the first block comprises a first block unit, the second block comprises a second block unit, and a first indicator is configured in the first block unit; and
- determining, based on an indication of thefirst indicator, whether the second block unit is a control code, wherein
- the first block further comprises a third block unit, the third block unit is before the first block unit, and a second indicator is further configured in the first block unit; and
- the method further comprises:
- determining, based on an indication of the second indicator, whether the third block unit before the first block unit is a control code.

10. The method according to claim 9, wherein the method further comprises: if it is determined that the first block unit is a control code, determining a quantity of D codes in the first block unit based on another indicator in the first block unit;
- at least one of the control code forming the first block unit or the control code forming the second block unit comprises one K code, or comprises one K code and at least one D code; and
- the K code is a control code and each of the D codes is a data code.

11. A block receiving method, wherein the method comprises:
- receiving a first block and a second block, wherein the first block comprises a first block unit, the second block comprises a second block unit, and a first indicator is configured in the first block unit; and
- determining, based on an indication of the first indicator, whether the second block unit is a control code;
- wherein the second block further comprises another block unit, the another block unit is after the second block unit, and at least one indicator is configured in the second block unit; and
- the method further comprises:
- determining, based on the at least one indicator in the second block unit, whether the another block unit is a control code and whether the first block unit is a control code.

12. The method according to claim 9, wherein the determining, based on an indication of the first indicator, whether the second block unit is the control code comprises:
- if the first indication information indicates that the second block unit is not a control code, determining that a data code starts from the second block unit.

13. A block generation apparatus, wherein the apparatus comprises:
- a processor, configured to generate a first block and a second block, wherein the first block comprises a first block unit, the second block comprises a second block unit, a first indicator is configured in the first block unit, and the first indicator is used to indicate whether the second block unit is a control code; and a sender, configured to send the first block and the second block, wherein the first block further comprises a third block unit, and the third block unit is before the first block unit; and a second indicator is further configured in the first block unit, and the second indicator is used to indicate whether the third block unit before the first block unit is a control code.

14. The apparatus according to claim 13, wherein the control code comprises one K code, or comprises one K code and at least one D code;

if the first block unit is a control code, another indicator is further configured in the first block unit, and the another indicator is used to indicate a quantity of D codes in the first block unit; and the K code is a control code and the D code is a data code.

15. The apparatus according to claim 13, wherein the second block further comprises another block unit, and the another block unit is after the second block unit; and at least one indicator is configured in the second block unit, and the at least one indicator is used to indicate whether the another block unit is a control code and indicate whether the first block unit is a control code; and if the second block unit is the control code, the at least one indicator is further used to indicate a quantity of D codes in the second block unit; and each of the D codes is a data code.

16. A block generation apparatus, wherein the apparatus comprises:

a processor, configured to generate a first block and a second block, wherein the first block comprises a first block unit, the second block comprises a second block unit, a first indicator is configured in the first block unit, and the first indicator is used to indicate whether the second block unit is a control code;

a sender, configured to send the first block and the second block; and an obtaining unit, wherein the obtaining unit is configured to obtain a first bitstream, wherein the first bitstream comprises a first control code; and the processor is specifically configured to: compress the first control code in the first bitstream, configure a first indicator in remaining block space after the compression, and generate the first block and the second block.

17. The apparatus according to claim 16, wherein the first control code in the first bitstream comprises at least one 8-bit block unit;

the processor is specifically configured to: compress one 8-bit block unit in the first bitstream to obtain N-bit remaining space, wherein N≤8; configure the first indicator in the N-bit remaining space, and fill the N-bit remaining space with one 8-bit K code; and generate the first block and the second block based on the 8-bit K code; and the 8-bit K code is a control code.

\* \* \* \* \*